(12) United States Patent
Young et al.

(10) Patent No.: US 8,434,809 B2
(45) Date of Patent: May 7, 2013

(54) DASH CLUSTER SYSTEM AND METHOD

(75) Inventors: Dennis R. Young, Sheffield Village, OH (US); Michael Eric Liedtke, Kent, OH (US); Ernest Richard-Dean Buehman, Maple Heights, OH (US)

(73) Assignee: Delta Systems, Inc., Streetsboro, OH (US)

( * ) Notice: Subject to any disclaimer, the term of this patent is extended or adjusted under 35 U.S.C. 154(b) by 0 days.

(21) Appl. No.: 13/218,573

(22) Filed: Aug. 26, 2011

(65) Prior Publication Data
US 2012/0049561 A1 Mar. 1, 2012

Related U.S. Application Data

(60) Provisional application No. 61/377,483, filed on Aug. 27, 2010.

(51) Int. Cl.
*B62D 25/14* (2006.01)
(52) U.S. Cl.
USPC .......................................................... 296/70
(58) Field of Classification Search ...................... 296/70
See application file for complete search history.

(56) References Cited

U.S. PATENT DOCUMENTS

| 7,077,452 | B2 * | 7/2006 | Song .............................. 296/70 |
| 7,264,294 | B2 * | 9/2007 | Gresham et al. ................ 296/70 |
| 7,777,639 | B2 | 8/2010 | Young et al. |
| 8,078,358 | B2 * | 12/2011 | Sumiya et al. .................. 701/36 |
| 2004/0183330 | A1 * | 9/2004 | Ruegenberg et al. ........... 296/70 |
| 2010/0191408 | A1 | 7/2010 | Boylston et al. |
| 2011/0265341 | A1 | 11/2011 | Young |

* cited by examiner

*Primary Examiner* — H Gutman
(74) *Attorney, Agent, or Firm* — Tarolli, Sundheim, Covell & Tummino LLP

(57) ABSTRACT

A dash cluster system and a method for securing and/or interconnecting a dash cluster to power equipment. The dash cluster system includes a housing having a connecting assembly including at least one peripheral connector positioned along a peripheral surface of the housing. The dash cluster system further comprises a bezel having a front side and a rear side. The bezel also comprises a connecting arrangement formed from at least one extending connector, extending from the rear side. The dash cluster system also comprises a securing connection formed between the housing and the bezel by the interlocking of the peripheral connector of the connecting assembly with the extending connector of the connecting arrangement.

12 Claims, 36 Drawing Sheets

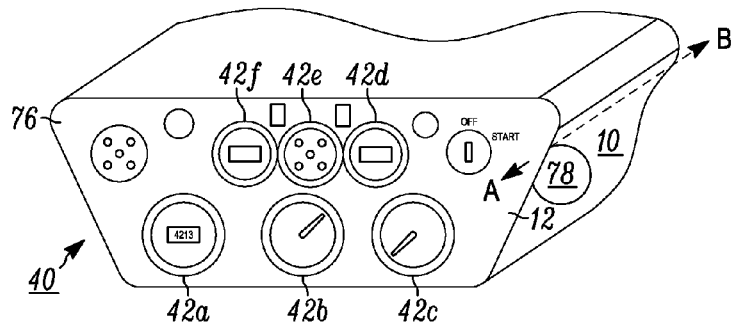
FIG. 4
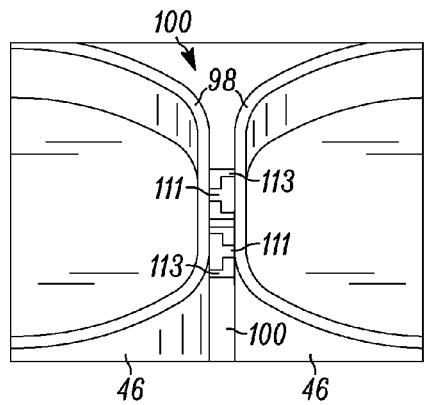
FIG. 24
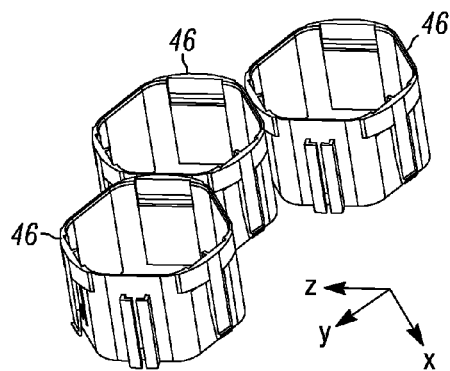
FIG. 25
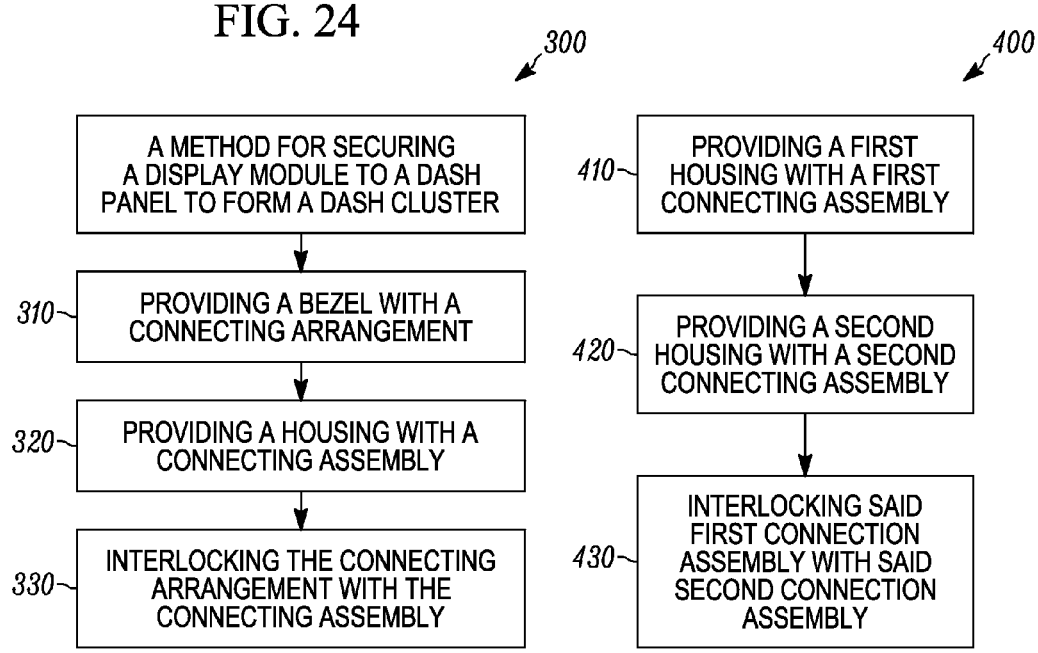
FIG. 29
FIG. 30

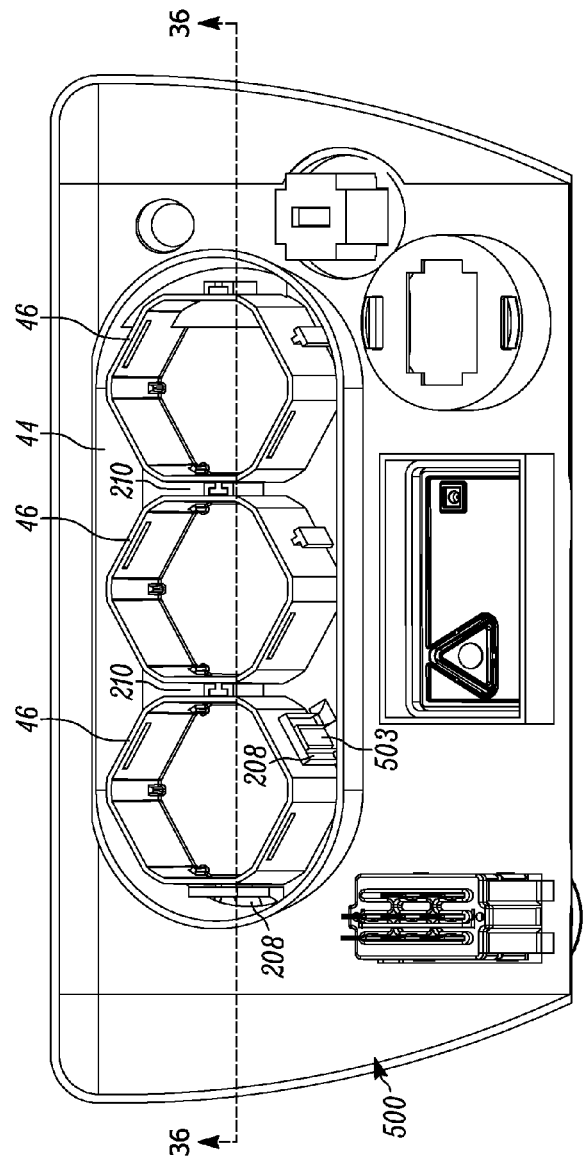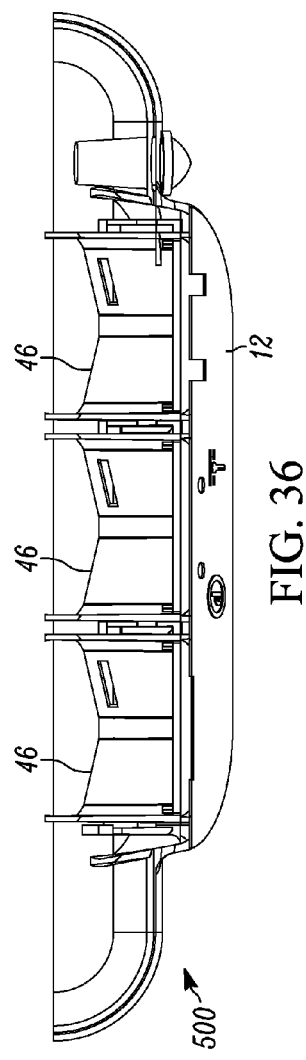
FIG. 35
FIG. 36

DASH CLUSTER SYSTEM AND METHOD

CROSS REFERENCES TO RELATED APPLICATIONS

The following application claims priority to U.S. Provisional Patent Application Ser. No. 61/377,483 filed Aug. 27, 2010 entitled DASH CLUSTER SYSTEM AND METHOD. The above-identified application is incorporated herein by reference in its entirety for all purposes.

TECHNICAL FIELD

The present disclosure relates to a system and a method for securing and/or interconnecting a dash cluster to power equipment, and more specifically, providing a flexible and modular system and method of securing and/or interconnecting components forming a dash cluster to power equipment.

BACKGROUND

Power equipment that includes for example, tractors, lawn and garden tractors, all terrain vehicles (ATVs), marine vehicles, boats, jet skis, and the like are offering more accessories and features as technology evolves. Such accessories and features include for example, tilt sensing equipment and electronics that measure the inclination of a garden tractor during operation. One example is described in further detail in U.S. patent application Ser. No. 12/686,722 that was filed on Jan. 13, 2010 entitled TILT AND/OR ACCELERATION SENSING APPARATUS AND METHOD, which is assigned to the assignee of the present disclosure. The TILT/ACCELERATION U.S. patent application identified above (hereinafter "the '722 Application") is incorporated herein by reference in its entirety for all purposes.

As more features and accessories are being offered, the amount of display modules needed to indicate the various parameters of operation to the operators of the power equipment also increases. Display modules are typically positioned on the dash panel of the power equipment, conveniently within the operator's viewing area. Display modules can include: diagnostic indicators such as pressure, fluid capacity, and temperature gauges; tilt sensor gauges; pre-heat conditions gauges for diesel engines; hour meters that track the number of hours the power equipment is used; rpm and speed gauges; and the like.

Illustrated in FIG. 1 is a perspective view of power equipment 10 in the form of a lawn garden tractor. The tractor 10 includes an instrument or dash panel 12 positioned behind a steering wheel 14 for operating the directional control of the lawn tractor. In FIG. 1, the instrument or dash panel 12 includes an ignition switch 16 for starting the lawn tractor 10 and display modules 20. FIGS. 2 and 3 are views of a custom display module 20 used in the power equipment 10 of FIG. 1 as described in detail in U.S. Pat. No. 7,777,639 to Young et al., which is owned by the assignee of the present disclosure. U.S. Pat. No. 7,777,639 is incorporated herein by reference in its entirety.

The custom display module 20 in FIG. 2 includes a bezel 22 and a housing 24 that is affixed to the bezel typically by sonic welding. Extending from the housing and/or parts connected from the rear of the housing are snap wings 26 and 28. Each custom display module 20 is individually installed and is secured to the instrument or dash panel 12 by passing the module in the direction of the arrow "A" in FIG. 3 through a specified opening 30 located in the dash panel. Upon passing of the custom display module 20 through the specified opening 30, the snap wings 26 and 28 spring outward from a deflected position created during the passage of the module through the opening. The snap wings 26 and 28 then secure the custom module 20 to the dash panel 12 through the opening 30 by forming a pressure fit against the panel between the wings and rear face 32 of the bezel 22.

Because the display module 20 is specifically sized to an application and has a specified dash panel opening, it is a custom display module. The molding for the housing 24, sizing of the snap wings 26, 28 and respective stack-ups between the rear face 32 of the bezel 22 and end of snap wings must be sized and tooled for each customer application, varying based on the size and type of custom module needed. As a result, cost associated with tooling transferred to each of the custom display modules becomes expensive. In addition, the attachment of each custom display module is secured primarily by the wings 26, 28 of the individual module. Therefore, any lapse in tolerance in either the molding or the thickness of the panel can result in loose or weakened connections.

SUMMARY

One example embodiment of the present disclosure includes a dash cluster for use with a dash panel on power equipment comprising a housing having a connecting assembly including at least one peripheral connector positioned along a peripheral surface of the housing. The dash cluster further comprises a bezel having a front side and a rear side. The bezel also comprises a connecting arrangement formed from at least one extending connector, extending from the rear side. The dash cluster also comprises a securing connection formed between the housing and the bezel by the interlocking of the peripheral connector of the connecting assembly with the extending connector of the connecting arrangement.

BRIEF DESCRIPTION OF THE DRAWINGS

The foregoing and other features and advantages of the present disclosure will become apparent to one skilled in the art to which the present disclosure relates upon consideration of the following description of the invention with reference to the accompanying drawings, wherein like reference numerals, unless otherwise described refer to like parts throughout the drawings and in which:

FIG. 4 is a perspective view of a dash panel supporting a dash cluster system constructed in accordance with one example embodiment of the present disclosure;

FIG. 24 is a partial perspective view of interconnected housing constructed in accordance with another example embodiment of the present disclosure;

FIG. 25 is an isometric view of several interconnected housings;

FIG. 29 is a flow diagram illustrating a method for securing a display module to a dash panel to form a dash cluster system in accordance with one example embodiment of the present disclosure;

FIG. 30 is a flow diagram illustrating a method for securing a display module to a dash panel to form a dash cluster system in accordance with another example embodiment of the present disclosure;

FIG. 35 is an inner view of the dash panel of FIG. 31;

FIG. 36 is a section view of FIG. 35 along section lines 36-36;

DETAILED DESCRIPTION

Referring now to the figures generally wherein like numbered features shown therein refer to like elements throughout unless otherwise noted. The present disclosure relates generally to a system and a method for securing and/or interconnecting a dash cluster to power equipment, and more specifically, providing a flexible and modular system and method of securing and/or interconnecting components forming a dash cluster to power equipment.

Figure 1:
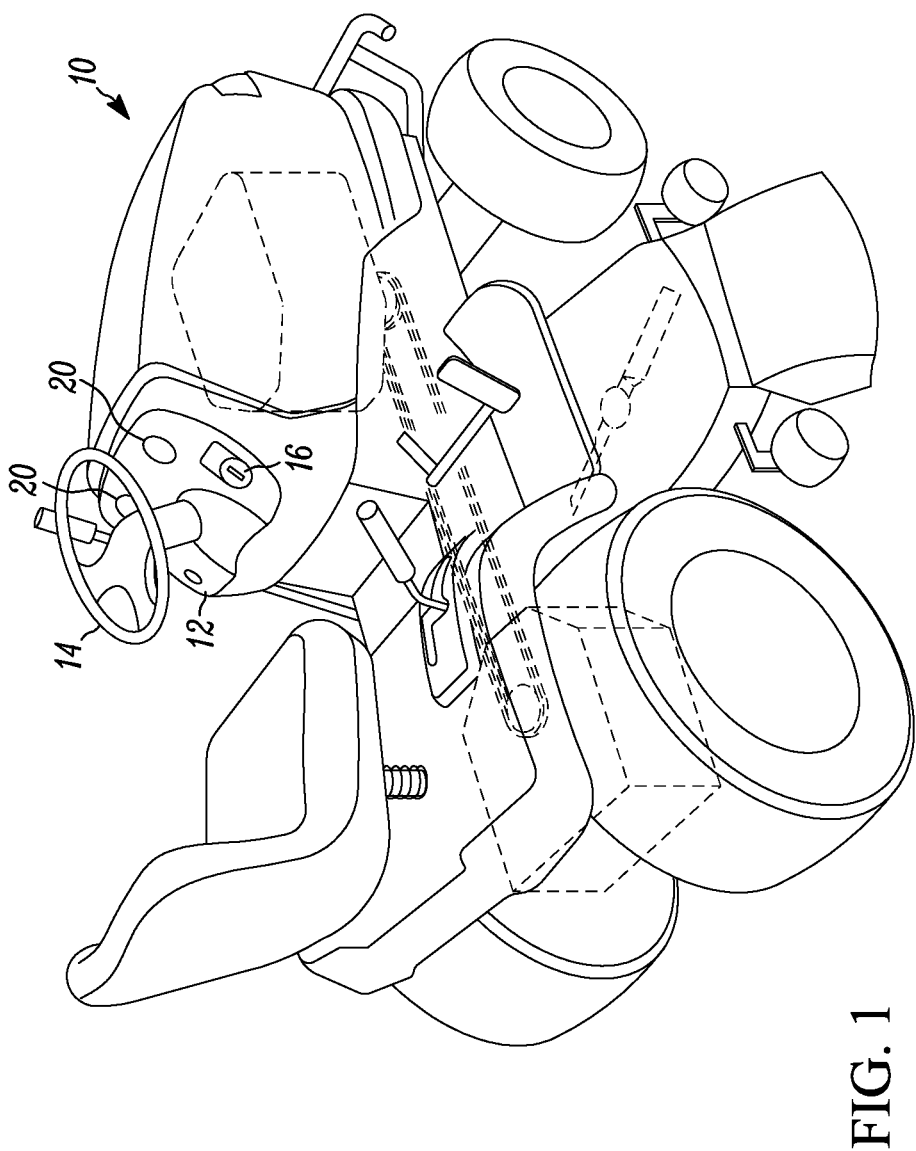
FIG. 1 is a perspective view of power equipment in the form of a lawn garden tractor.

Illustrated in FIG. 4 is a perspective view of a dash panel 12. Mounted in the dash panel 12 is a dash cluster system 40 constructed in accordance with one example embodiment of the present disclosure. The dash cluster system 40 in the example embodiment of FIG. 4 includes six (6) display assemblies 42a, 42b, 42c, 42d, 42e, and 42f that are interconnected and secured to the dash panel 12 of power equipment 10 such as the riding mower depicted in FIG. 1. Although the dash cluster system 40 illustrated in FIG. 4 includes six (6) interconnected display assemblies, the dash cluster system 40 could have any number and size display assemblies without departing from the spirit and scope of the present disclosure.

The display assemblies 42 of the dash cluster system 40 of FIG. 4 include three (3) large size display assemblies 42a-42c and three (3) small size assemblies 42d-42f. The first display assembly 42a includes a liquid crystal display ("LCD") that allows for multiple alphanumerical character combinations as appreciated by one skilled in the art. In the illustrated example embodiment of FIG. 4, the display assembly 42a is an hour meter. The second and third display assemblies 42b-42c comprise a needle gauge that is operated electro-mechanically by a wire feed or wireless-type signal. The needle gauge display assemblies 42b and 42c in the example embodiment may indicate to the operator of the power equipment 10, the power equipment's speed, rpm rates, fluid levels, and the like along an incremental scale surrounding the needle. Alternatively, there could be multiple needles such as for use as the hands of a clock.

The smaller display assemblies 42d-42f comprise any combination of electrical, electromechanical, and mechanical diagnostic indicators, such as light emitting diodes ("LEDs") that illuminate to warn or notify an operator of a sensed condition of the power equipment 10. For example, display assembly 42d includes five LEDs annularly surrounding the perimeter of an LCD. The LEDs may light to indicate low oil pressure, low fuel, high temperature, engaged power-take-off, or any other operating condition or diagnostic that might be useful to the operator relating to the power equipment 10.

Figure 5:
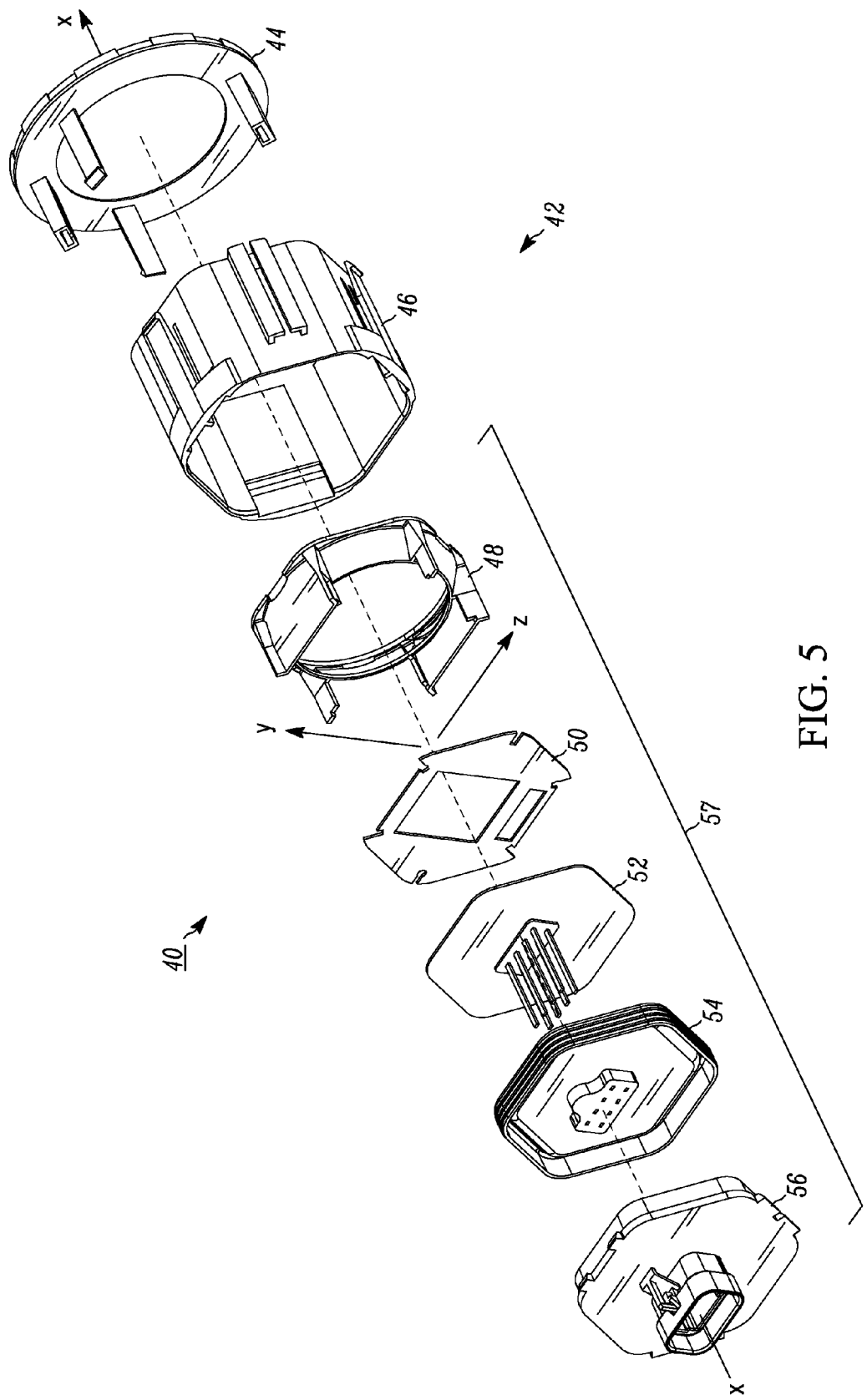
FIG. 5 is an exploded rearward view of a dash cluster system constructed in accordance with one example embodiment of the present disclosure.
Figure 6:
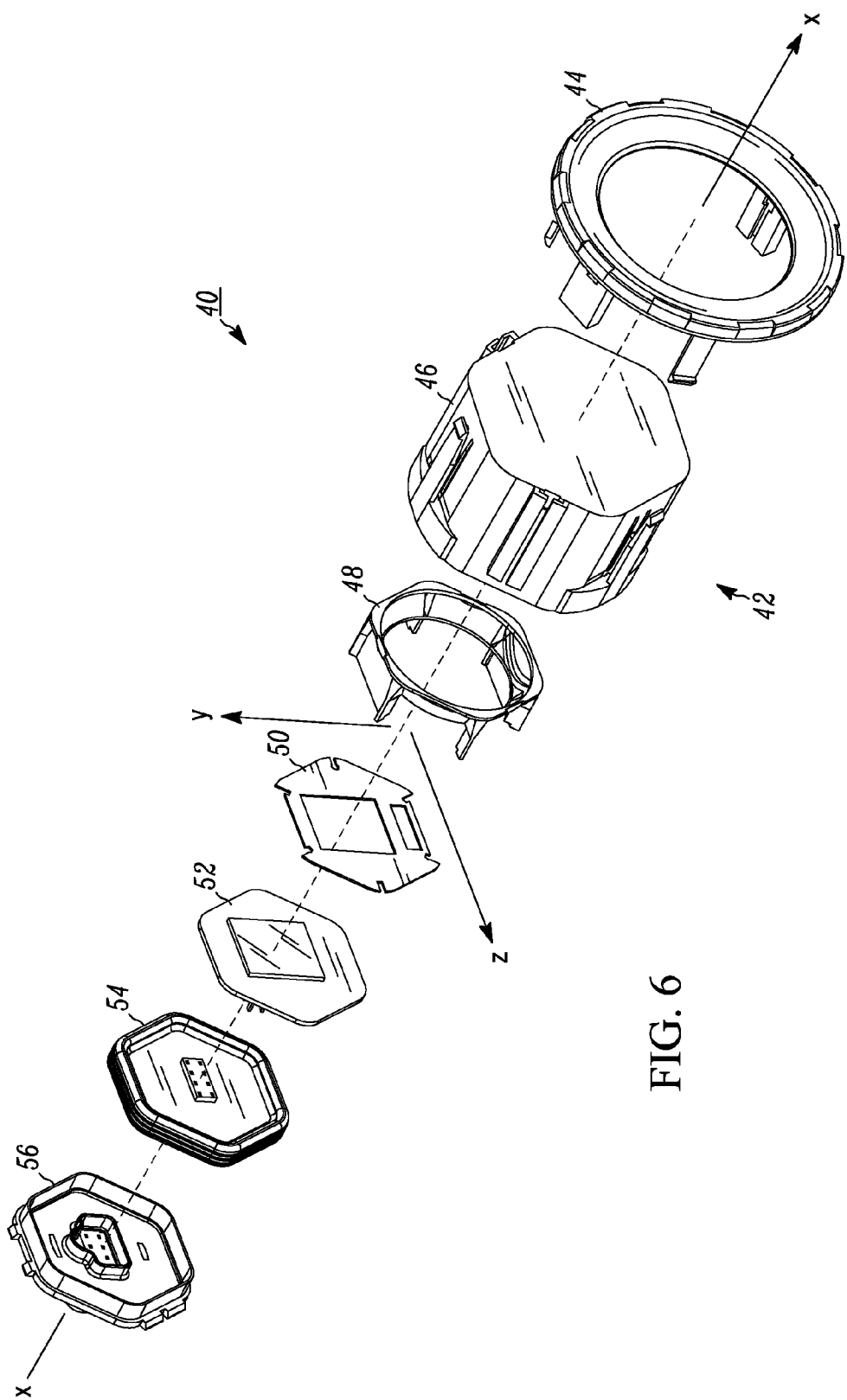
FIG. 6 is an exploded forward view of the dash cluster system of FIG. 5.

FIGS. 5 and 6 are exploded rearward and forward views, respectively of a dash cluster system 40 constructed in accordance with one example embodiment of the present disclosure. The dash cluster system 40 of the example embodiment of FIGS. 5 and 6 comprises a bezel 44, a housing 46, a spacer frame or offset 48, a decal or faceplate 50, gauge components 52 (such as a printed circuit board, electric circuit components, chips, electromechanical and mechanical components, LCDs, LEDs, and the like), seals or gaskets 54, and a connecting cover 56. In the illustrated example embodiment of FIGS. 5 and 6, the components forming the dash cluster system 40 are centrally located about axis X-X. In one example embodiment, components 57 positioned in the housing 46 of FIGS. 5 and 6 are similarly configured, constructed, operated, assembled, and connected to as corresponding components are described in U.S. provisional patent application Ser. No. 61/329,732 filed Apr. 30, 2010 and non-provisional U.S. patent application Ser. No. 13/097,199 that claims priority to the provisional application, both of which are entitled CONNECTION ASSEMBLY. The above U.S. patent applications are incorporated herein by reference in their entirety.

Figure 7:
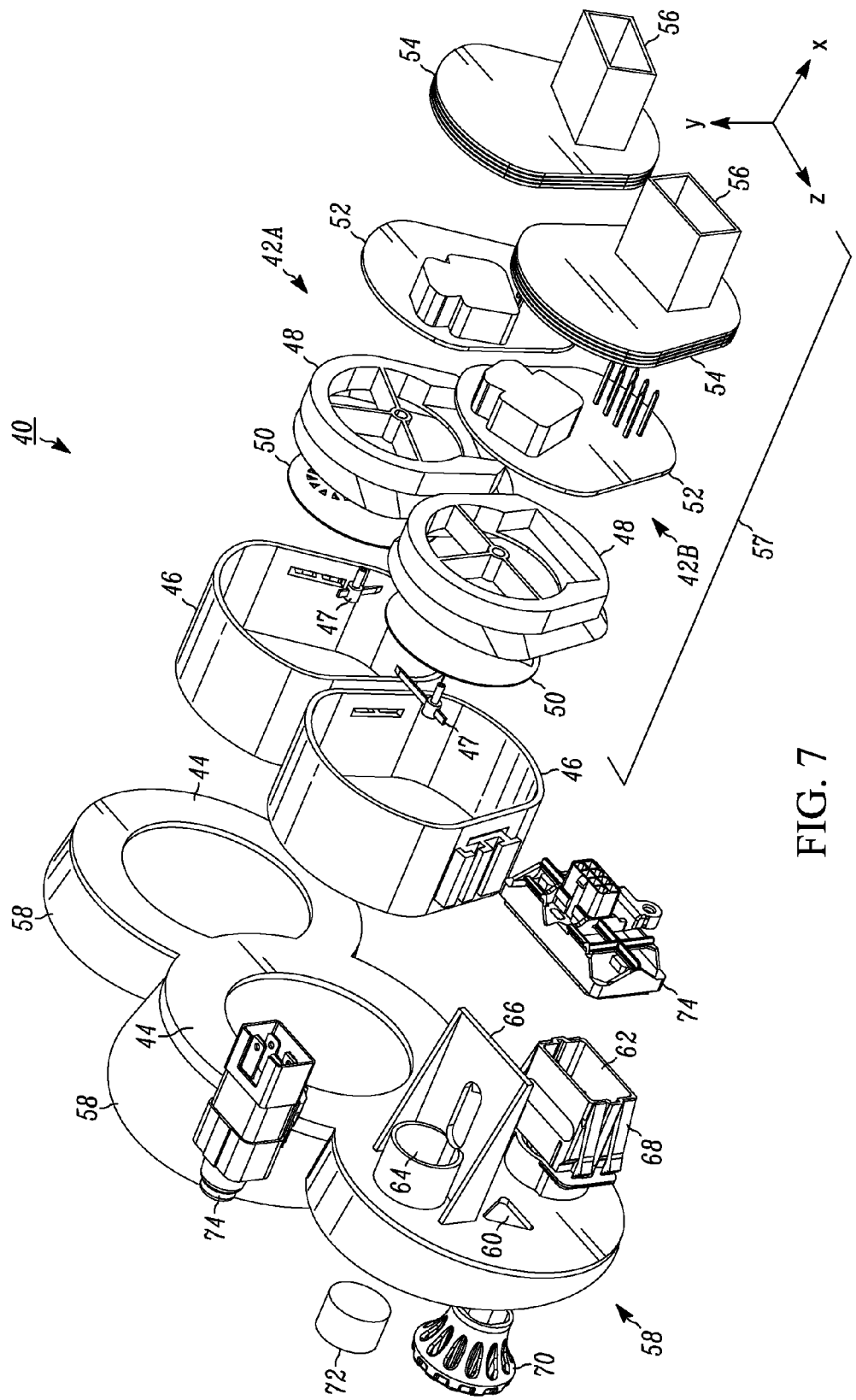
FIG. 7 is an exploded rearward view of a dash cluster system constructed in accordance with another example embodiment of the present disclosure.
Figure 8:
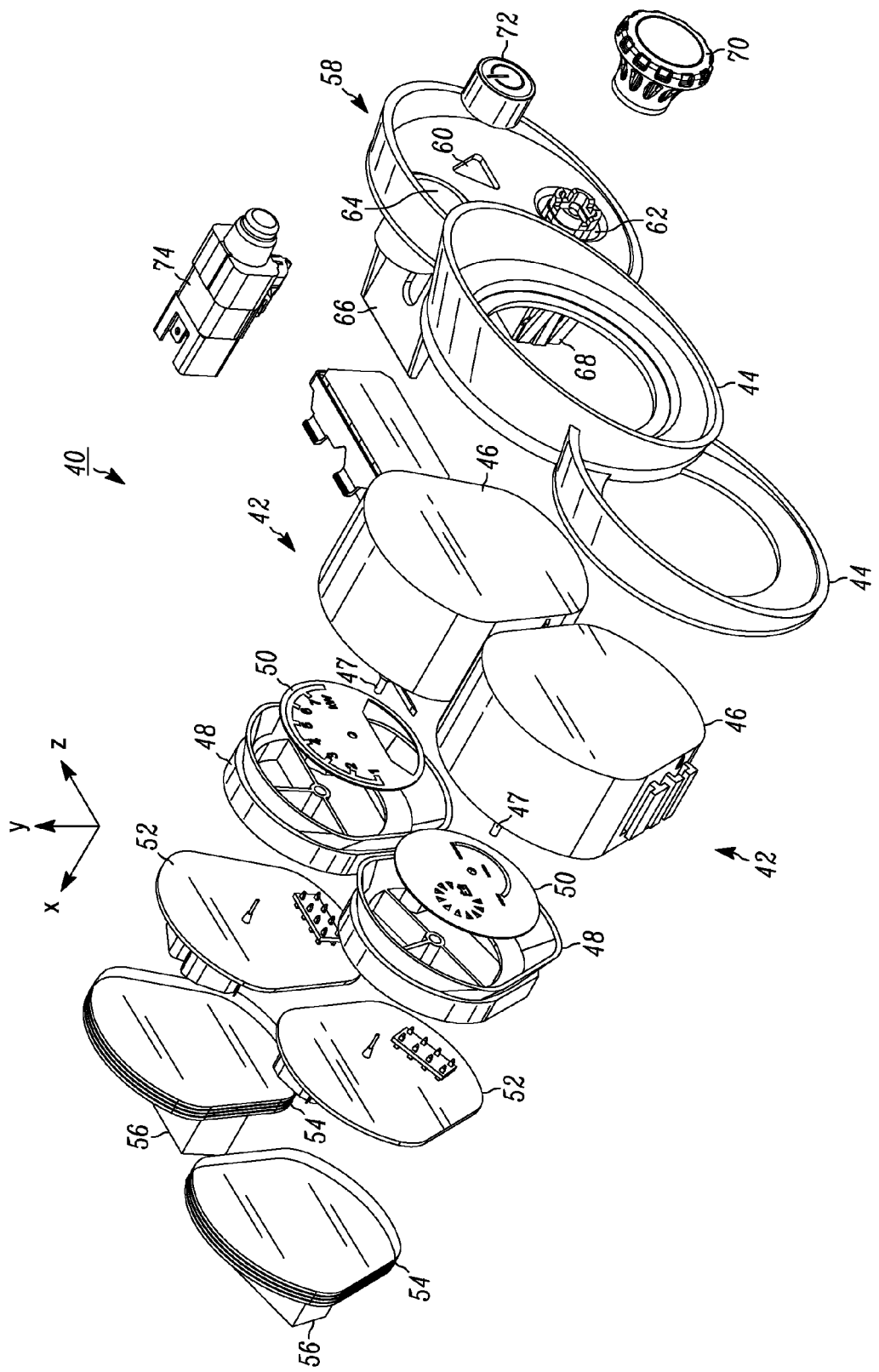
FIG. 8 is an exploded forward view of the dash cluster system of FIG. 7.

FIGS. 7 and 8 are exploded rearward and forward views, respectively of a dash cluster system 40 constructed in accordance with another example embodiment of the present disclosure having one or more display assemblies 42A and 42B. The dash cluster system 40 of the example embodiment of FIGS. 7 and 8 comprises bezels 44, housings 46, needles 47, spacer frames or offsets 48, decals or faceplates 50, gauge components 52 (such as a printed circuit board, electric circuit components, chips, electromechanical and mechanical components, LCDs, LEDs, and the like), seals or gaskets 54, and connecting covers 56. In one example embodiment, components 57 positioned in the housing 46 of FIGS. 7 and 8 are similarly configured, constructed, operated, assembled, and connected to as corresponding components are described in U.S. provisional patent application Ser. No. 61/329,732 filed Apr. 30, 2010 and non-provisional U.S. patent application Ser. No. 13/097,199 that claims priority to the provisional application, both of which are entitled CONNECTION ASSEMBLY. The above U.S. patent applications are incorporated herein by reference in their entirety.

In an alternative example embodiment as illustrated in FIGS. 7 and 8, the dash cluster system 40 may include one or more shroud arrangements 58 integrated into one or more bezels 44. The shroud arrangements 58 also include openings 60, 62, 64 flanges 66 or supports 68 to house or secure various switches 70, dials 72, and electromechanical devices 74 as further illustrated in FIGS. 7 and 8.

Figure 9:
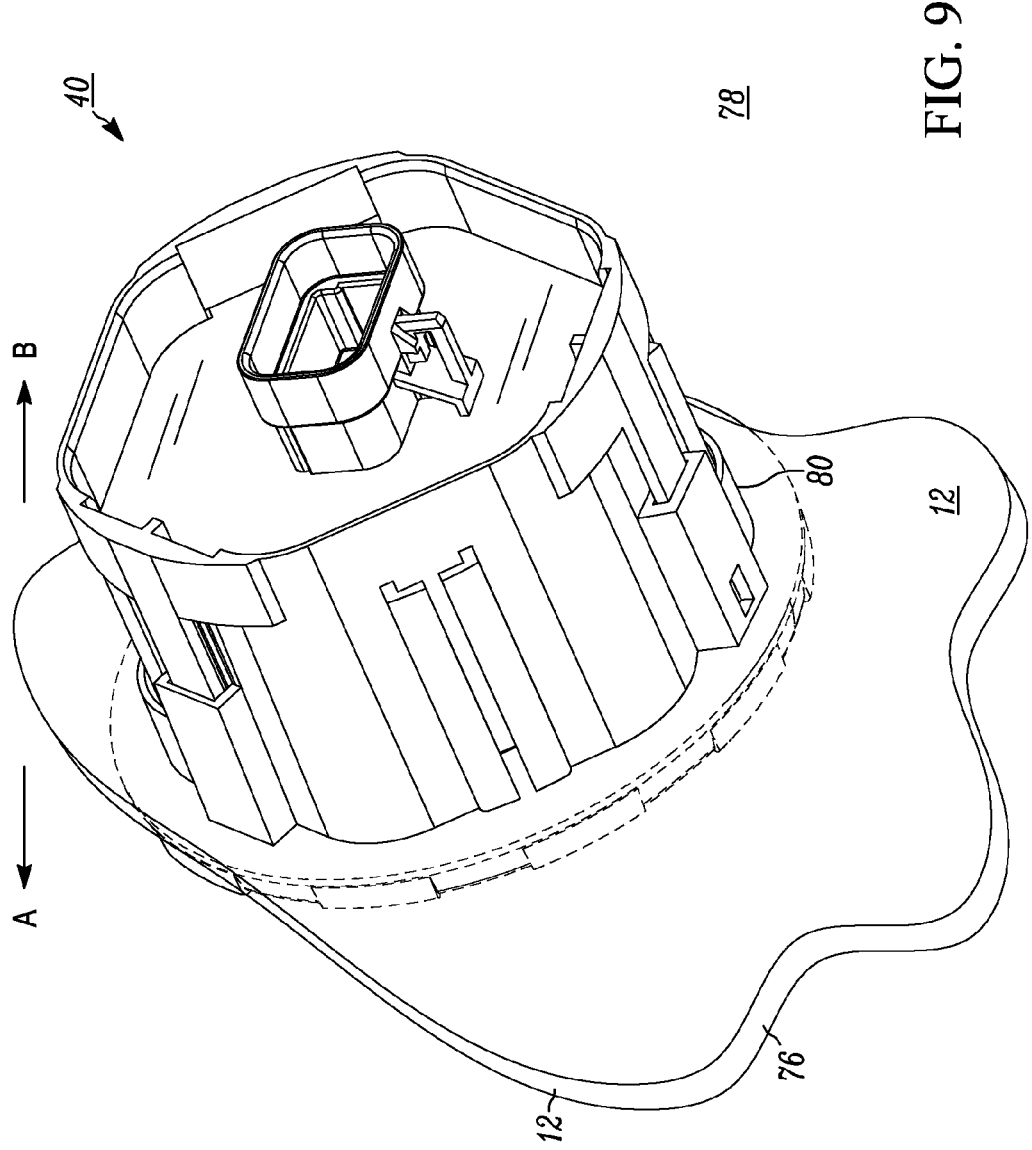
FIG. 9 is a perspective rearward view of a dash cluster system mounted into a partial section of a dash panel in accordance with one example embodiment of the present disclosure.

The bezel 44 of the dash cluster 40 is located on the exterior surface 76 of the dash panel 12 visible to the operator in the direction arrow "A" in FIGS. 4 and 9. The remainder of the dash cluster system 40 is located within the interior area 78 not visible to the operator in the direction of arrow "B" of FIGS. 4 and 9. The dash panel 12 includes an opening 80 to accommodate one or more display assemblies 42 forming the dash cluster system 40 as illustrated in FIG. 9. The opening 80 in the dash panel 12 is constructed such that it is not large enough to allow the bezel 44 or combination of bezels 44 joined via one or more coupled housings 46 to pass through to the interior area 78.

Illustrated in FIGS. 10-14 are various views of a bezel 44 constructed in accordance with one example embodiment of the present disclosure. While the bezel 44 in the illustrated example embodiment of FIGS. 10-14 is circular in shape and formed from a plastic material, it could be any geometrical configuration and formed from any comparable material of similar strength and weight without departing from the spirit and scope of the present disclosure. The bezel 44 includes a front side 82 that is seen by the operator as it extends away from the dash panel 12 in FIGS. 4 and 9. The bezel 44 also includes a rear side 84 that is in contact with the dash panel 12 in the assembled construction of FIGS. 4 and 9.

Extending from, and molded into the bezel 44 are a plurality of connecting arrangements 86. In the illustrated example embodiment of FIGS. 10-14, the connecting arrangements 86 comprise two (2) male connectors 88 and two (2) female connectors 90. The connectors 88 and 90 forming the connecting arrangement 86 are substantially equidistant radially (see radial Y-axis in FIG. 14) from the central X-axis (of FIGS. 5, 6, and 14) of an opening 92 of the bezel 44. However, in the illustrated example embodiment of FIGS. 10-14, the connecting arrangements 86 are asymmetrically located around the inner surface 84 of the bezel 44. Stated another way, the connectors 88 and 90 are not located at 90 degree increments around the 360 degree perimeter of the bezel 44, but instead three (3) of the connectors are located within 180 degrees. This asymmetrical configuration of the connecting arrangements 86 in the illustrated example embodiment allows for error proofing when the housing 46 is attached to the bezel 44 during assembly. It is the intent however, that any number of male 88 or female 90 connectors extending from an unlimited number of locations along the inner surface 84 is within the spirit and scope of the present disclosure.

Illustrated in FIGS. 15-18 are various views of a housing 46 constructed in accordance with one example embodiment of the present disclosure. While the housing 46 in the illustrated example embodiment of FIGS. 15-18 is hexagonal in shape and formed from a plastic material, it could be any geometrical configuration having any number of sides or a single continuous or circular side and formed from any comparable material of similar strength and weight without departing from the spirit and scope of the present disclosure. The housing 46 includes a front side 94 that is transparent allowing indicia from the decal or faceplate 50 such as an oil pressure symbol, temperature, LCDs and LEDs to be seen by the operator as it faces outward from the dash panel 12 in the direction of arrow A in FIGS. 4 and 9. The housing 46 also includes a rear side 96 that extends away from the dash panel 12 toward arrow B in FIGS. 4 and 9.

Extending from, and integrated along a select number of peripheral sides 98 of the housing 46 is a connecting assembly 100. In the illustrated example embodiment of FIGS. 15-18, the connecting assembly 100 comprises two (2) male connectors 110 and two (2) female connectors 112. The connectors 110 and 112 forming the connecting assembly are substantially equidistant radially (see radial Y-axis in FIG. 16) from the central X-axis (of FIGS. 5, 6, and 16) of the housing 46. However, in the illustrated example embodiment of FIGS. 15-18, the connecting assembly 100 is asymmetrically located around the peripheral sides 98 of the housing 46. Stated another way, the connectors 110 and 112 are not located at 90 degree increments around the 360 degree perimeter (formed about the X-axis) of the housing 46, but instead three (3) of the connectors are located within 180 degrees. This asymmetrical configuration of the connecting assembly 100 in the illustrated example embodiment allows for error proofing when the housing 46 is attached to the bezel 44 during assembly. It is the intent however, that any number of male 110 or female 112 connectors extending from an unlimited number of locations along the peripheral surface 98 is within the spirit and scope of the present disclosure.

In the illustrated example embodiments of FIGS. 10-14 and 15-18, the connecting arrangement 86 of the bezel 44 and connecting assembly 100 of the housing 46 are located in such a way to facilitate the securing of the bezel 44 to the housing 46, and thus, securing the dash cluster 40 to the dash panel 12. Advantageously, this securing feature eliminates the need for customer specific housing sizes, tooling, or application specific snap wings 26 and 28, making the dash cluster system 40 more versatile for securing. The interconnection and securing between the bezel 44 and housing 46 is further illustrated in FIGS. 19-22.

Connecting Arrangements 86 of the Bezel 44

Figure 10:
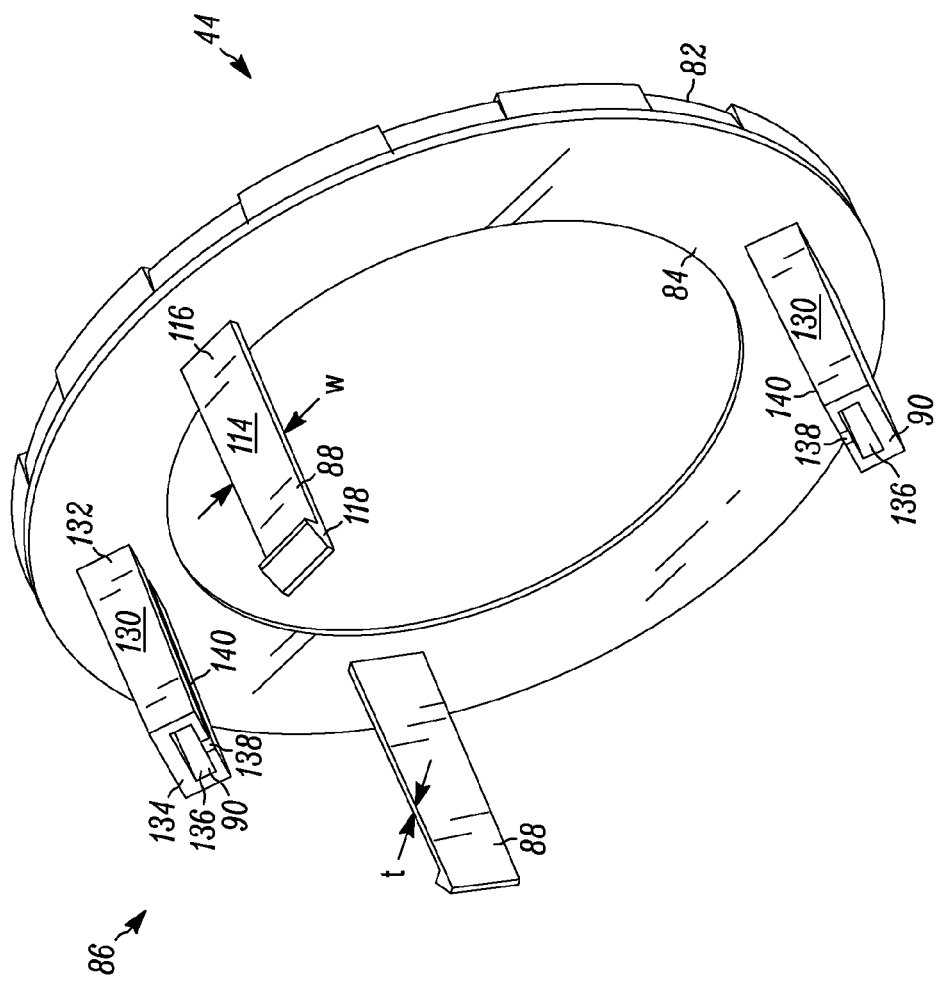
FIG. 10 is a rearward perspective view of a bezel constructed in accordance with one example embodiment of the present disclosure.
Figure 11:
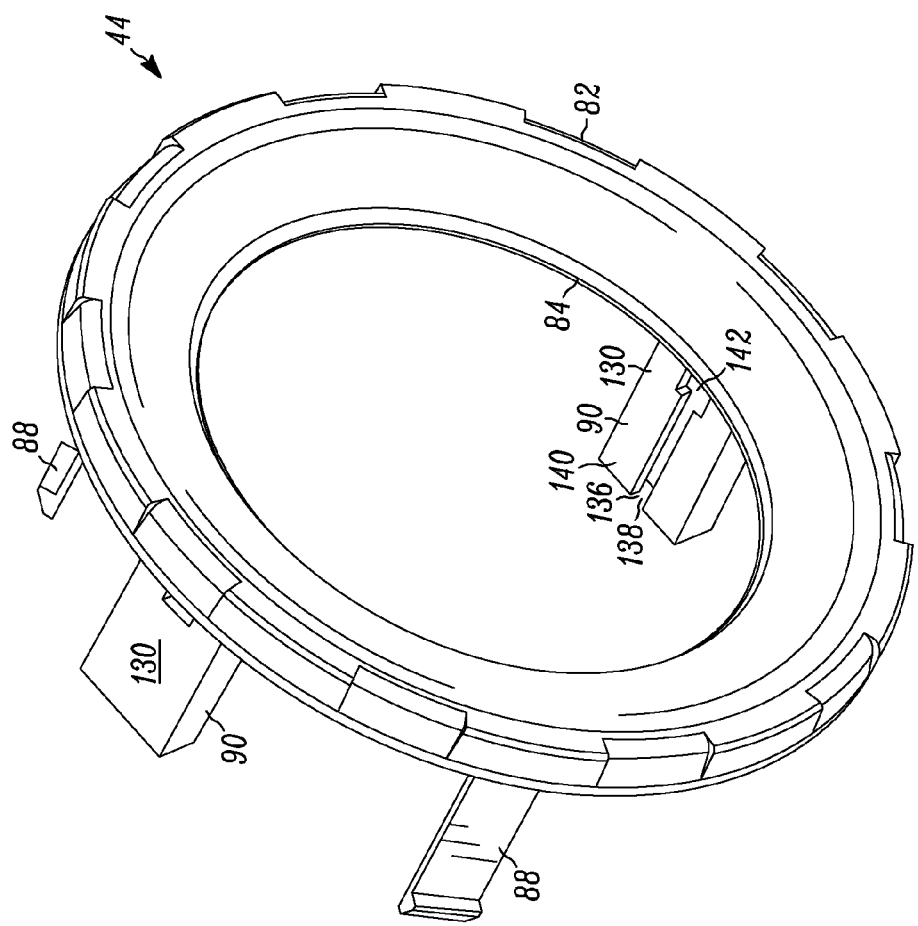
FIG. 11 is a forward perspective view of the bezel of FIG. 10.
Figure 12:
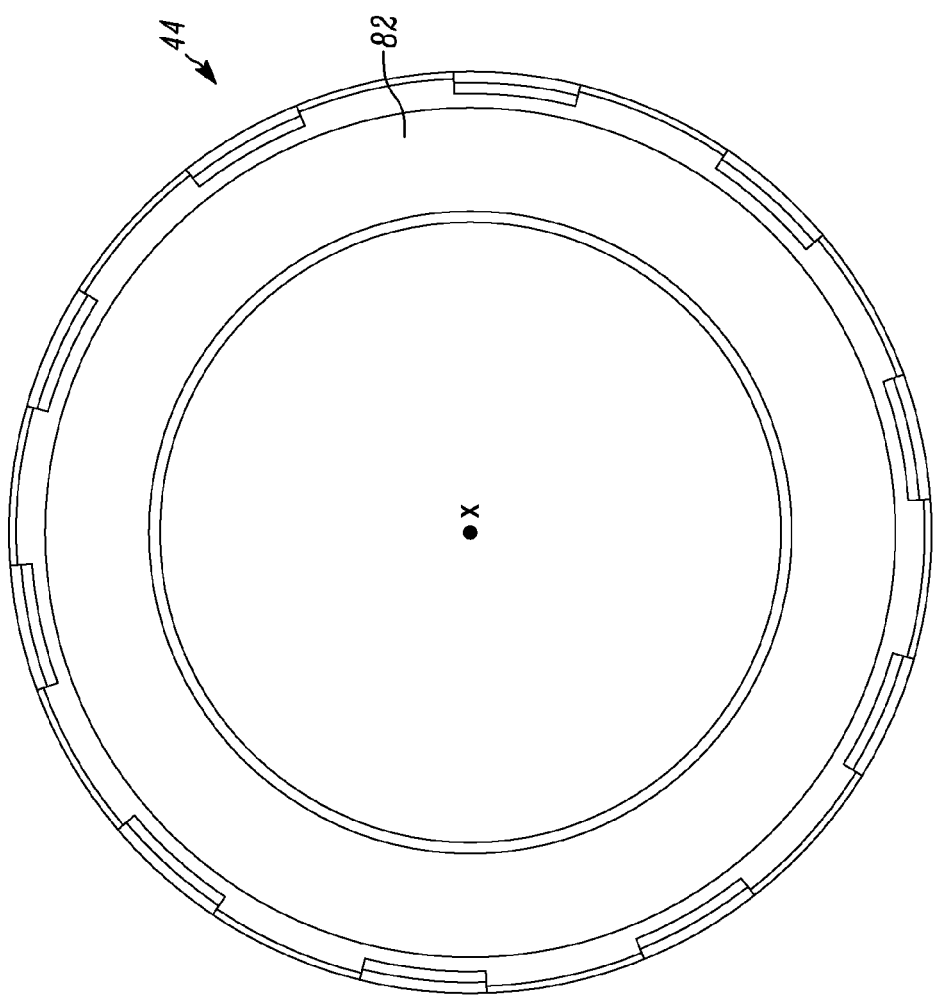
FIG. 12 is a front view of the bezel of FIG. 10.
Figure 13:
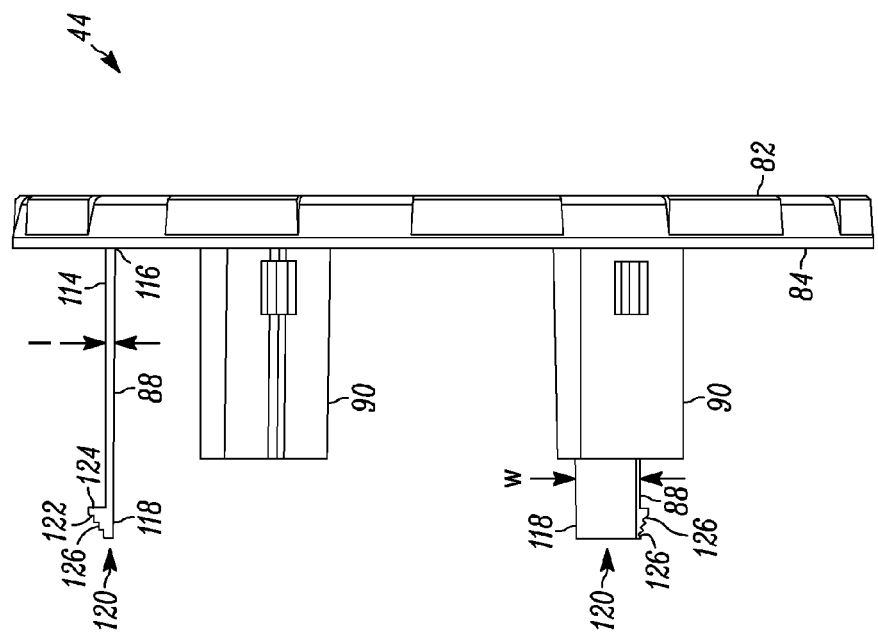
FIG. 13 is a side view of the bezel of FIG. 10.
Figure 14:
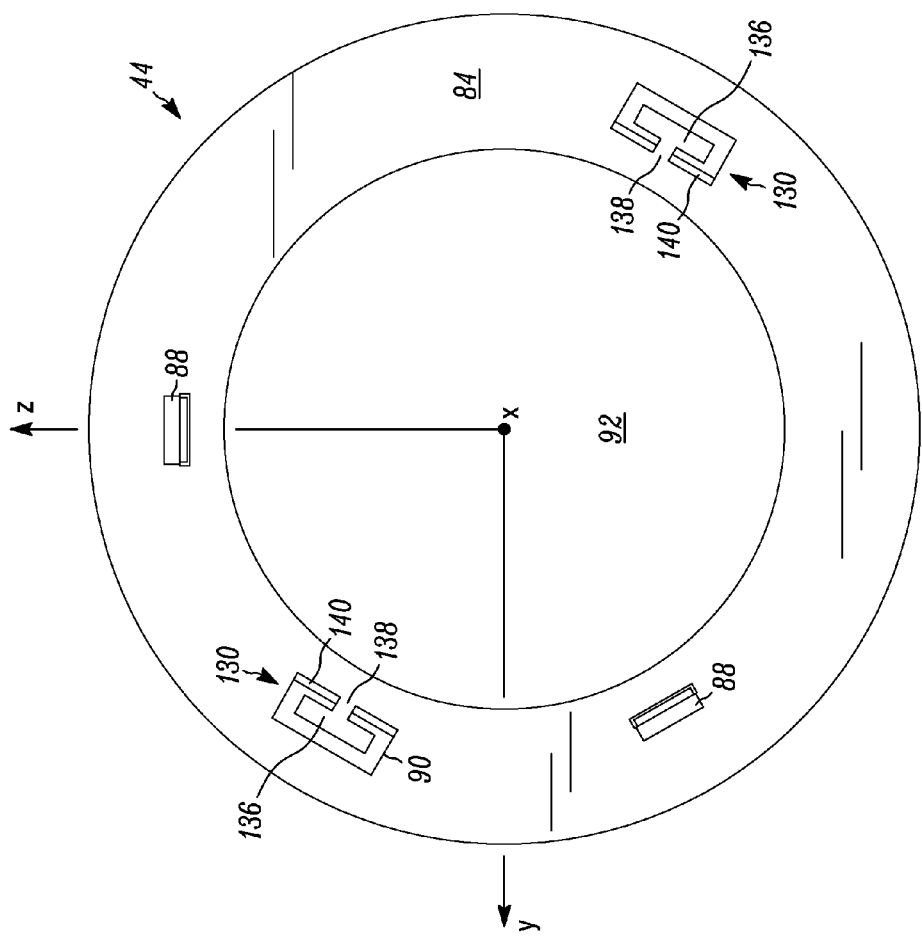
FIG. 14 is a rear view of the bezel of FIG. 10.
Figure 15:
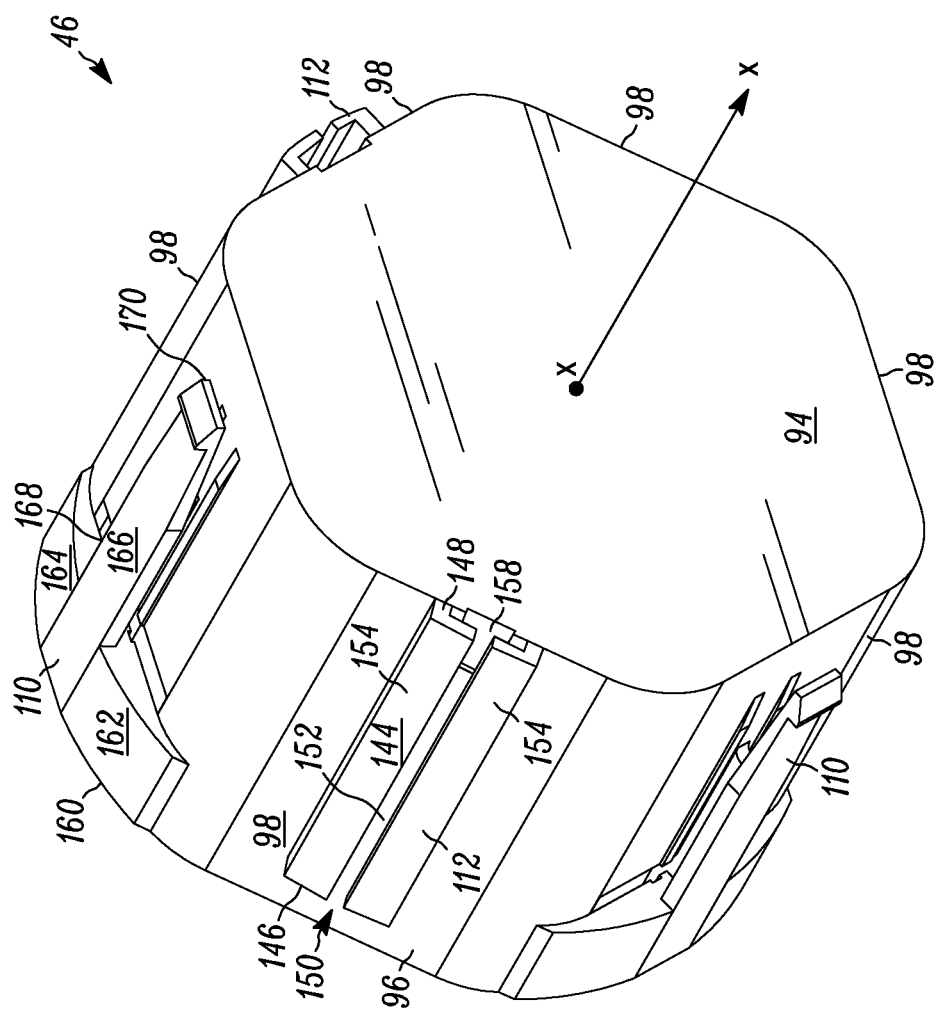
FIG. 15 is forward perspective view of a housing constructed in accordance with one example embodiment of the present disclosure.
Figure 16:
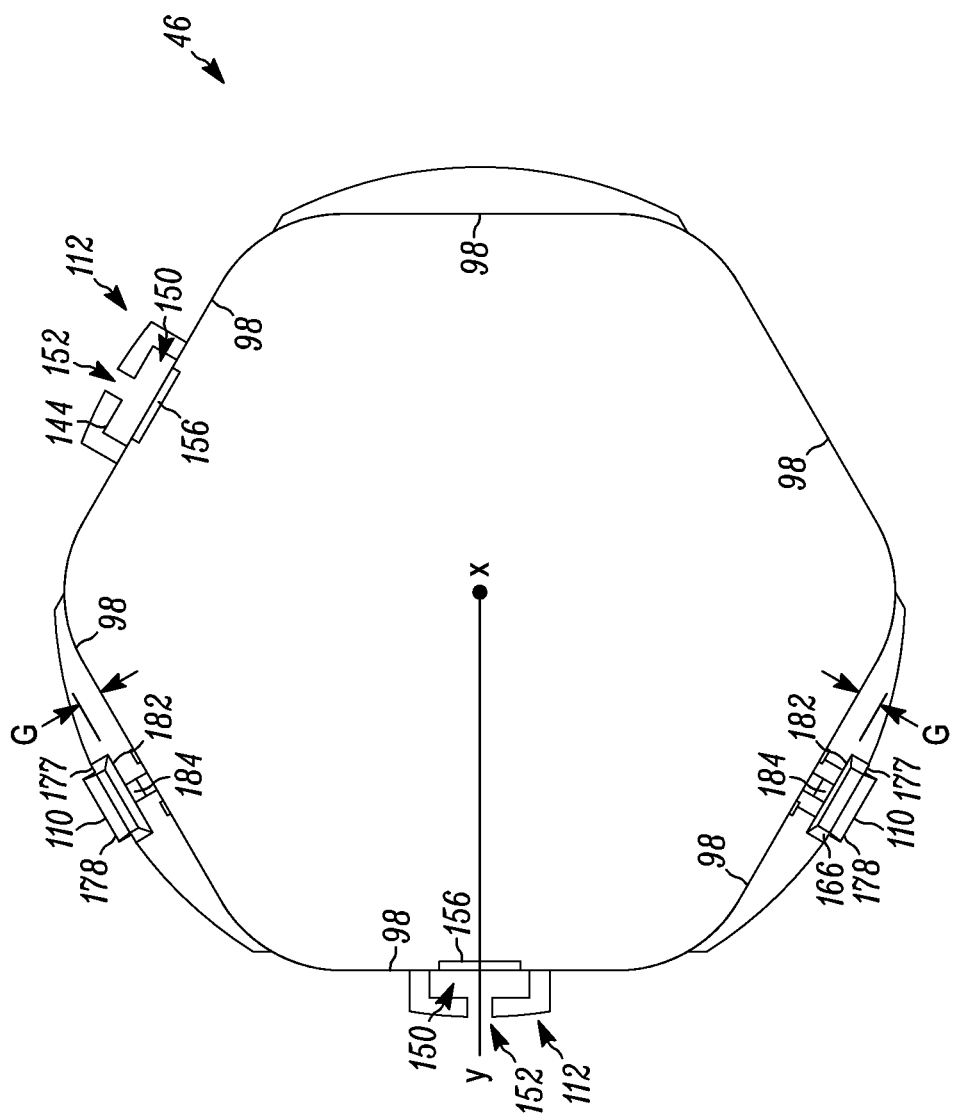
FIG. 16 is a front view of the housing of FIG. 15.
Figure 17:
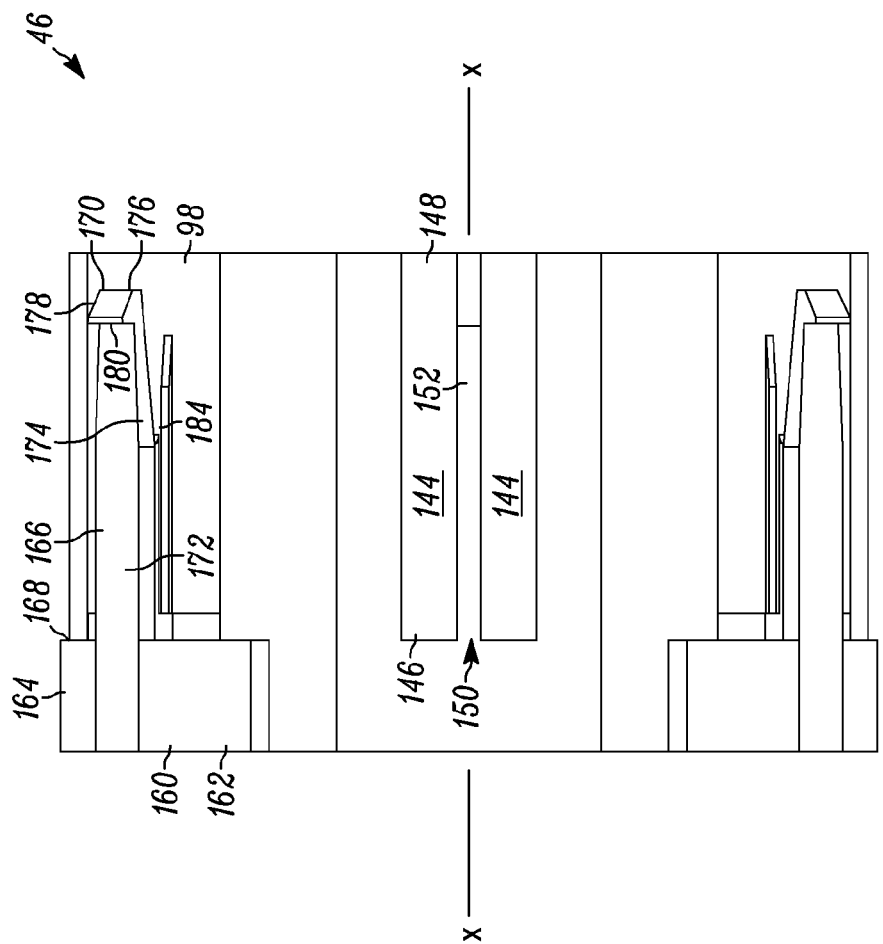
FIG. 17 is a side view of the housing of FIG. 15.
Figure 18:
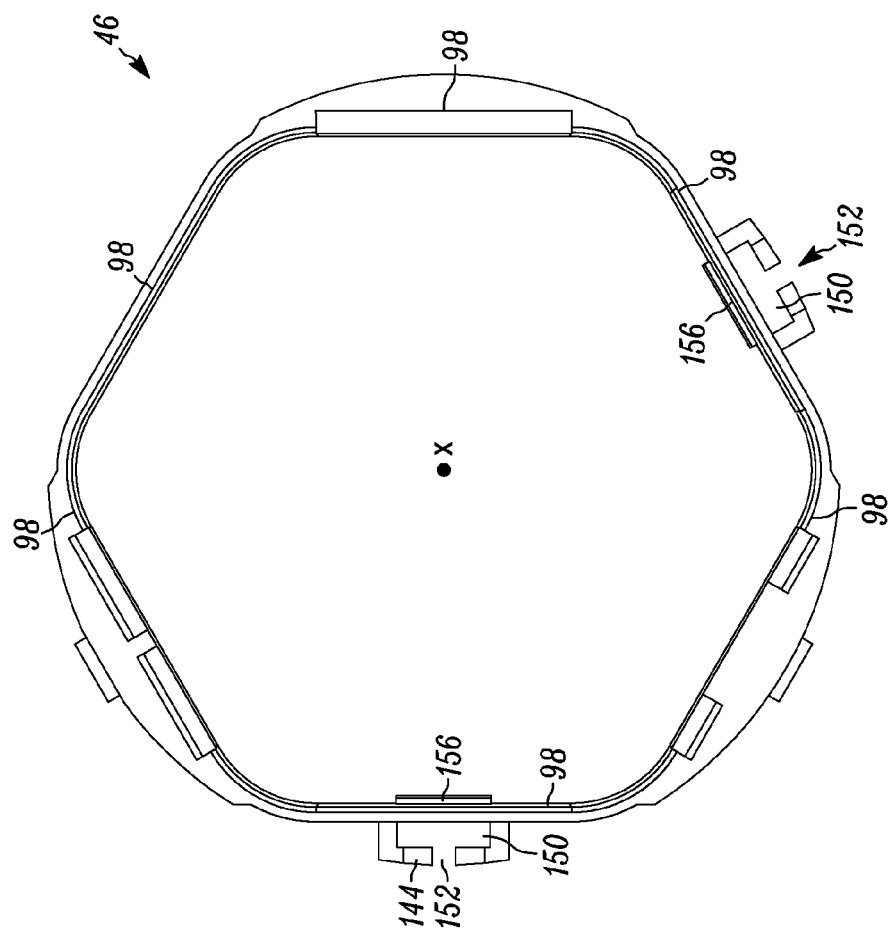
FIG. 18 is a rear view of the housing of FIG. 15.

In the example embodiment of FIGS. 10 and 13, the male connectors 88 alternate with the female connectors 90 about the periphery, and the male connectors 88 include a substantially planer body 114 having a relatively uniform width "W" and thickness "t" in rectangular shape extending from a distal end 116 that is molded into the rear side 84 of the bezel 44 to a proximal end 118. The proximal end 118 includes a latch 120 (FIG. 13) having a riser 122 extending away from the proximal end 118 and body 114 as it approaches the distal end 116. The riser 122 terminates at a catch surface 124 that is normal to the body 114. Serrations 126 cover the surface of the riser 122.

In the example embodiment of FIGS. 10-14, the female connectors 90 alternate with the male connectors 88 about the periphery. The female connectors 90 include a c-shaped body 130 extending from a proximal end 132 to a distal end 134 and is molded into the rear side 84 of the bezel 44. The c-shaped body 130 includes an passageway 136 that runs from the proximal to distal ends. The passageway 136 is T-shaped and includes and entryway into the body 130 at the distal end 134 and a slot 138 formed in an inner radial wall 140 of the body 130. The opening 136 further comprises relief aperture 142 located at the proximal end 132 of the slot 138 that is a rectangular in shape, slightly larger than the slot, and axially aligned about a slot centerline.

Connecting Assemblies 100 of the Housing 46

Referring now to FIGS. 15-18 and 26, the male connectors 110 of the housing include a support 160 molded into select peripheral sides 98. The support includes first and second sections, 162 and 164, respectively divided by a cantilever member 166 spaced or suspended above and radially outward from the selected peripheral sides 98 from a first end 168 at a region of the support sections 162, 164 to a second end 170. The cantilever member 166 includes a uniform section 172 of constant thickness and width over half the length of the cantilever member 166 before the cross-section begins to converge toward the second end 170 at a tapered region 174. The tapered region 174 includes a latch 176 at the second end 170 on an outer side 177 comprising a riser 178 in the form of an inclined plane extending away from the peripheral side 98 as the riser transitions from the second end 170 to the first end 168. The riser 178 terminates at a catch surface 180 that is normal to the body of the cantilever member 166. Extending from an inner side 182 facing the peripheral side 98 of the housing is a guide rail 184. The guide rail 184 has a rectangular cross-section smaller than the uniform section 172 and is centrally located below the entire length of the uniform section on the inner side 182. The guide rail 184 extends along a portion of the inner most portion of the cantilever member 166, forming a clearance gap "G" between the cantilever member and the selected peripheral side 98.

In the example embodiment of FIGS. 15-18 and 23, the female connectors 112 alternate with the male connectors 110. The female connectors 112 include a c-shaped body 144 extending from one end 146 to a second end 148 that is molded into select peripheral sides 98 of the housing 46. The c-shaped body 144 includes an opening 150 that extends between the two ends and is bounded along one side with the wall of the peripheral side 98. The opening 150 is T-shaped and includes openings in the body 144 that extends between the two ends 146, 148 and includes a slot 152 formed along an outer radial wall 154 of the body 144. The opening 150 further comprises relief recess 156 that is a rectangular depression in the peripheral side 98 axially aligned with the slot 152 at the end 148 of the c-shaped body 144.

In yet another example embodiment illustrated in FIG. 24, the housings 46 includes dual connecting assemblies 100 on a single peripheral side 98 of each housing. Each peripheral side 98 comprises a male connector 111 and a female connector 113 that are T-shaped and parallel to one another. During interconnection of the housings 46 in FIG. 24, the male and female connectors 111, 113, respectively of each housing engages corresponding female and male connectors.

Assembly of Dash Cluster System 40

Figure 19:
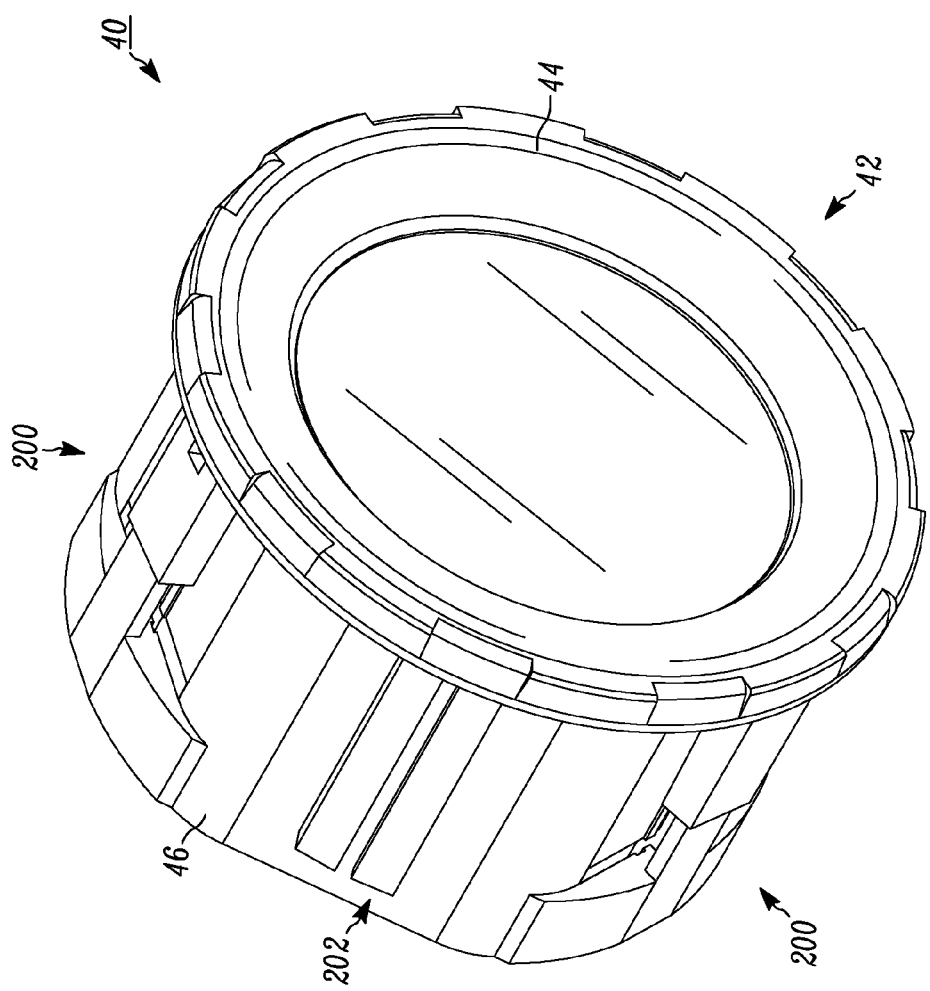
FIG. 19 is a forward perspective view of a dash cluster system illustrating the interconnection and securing of a housing with a bezel in accordance with one example embodiment of the present disclosure.
Figure 20:
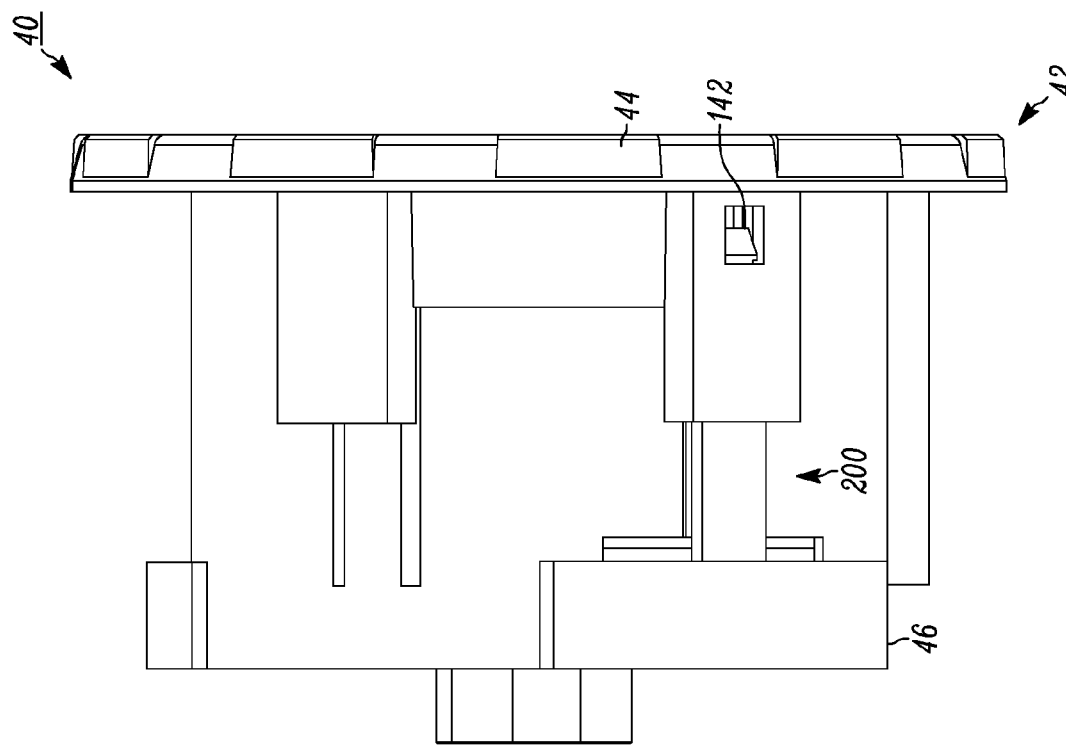
FIG. 20 is a side elevation view of the dash cluster system of FIG. 19.
Figure 21:
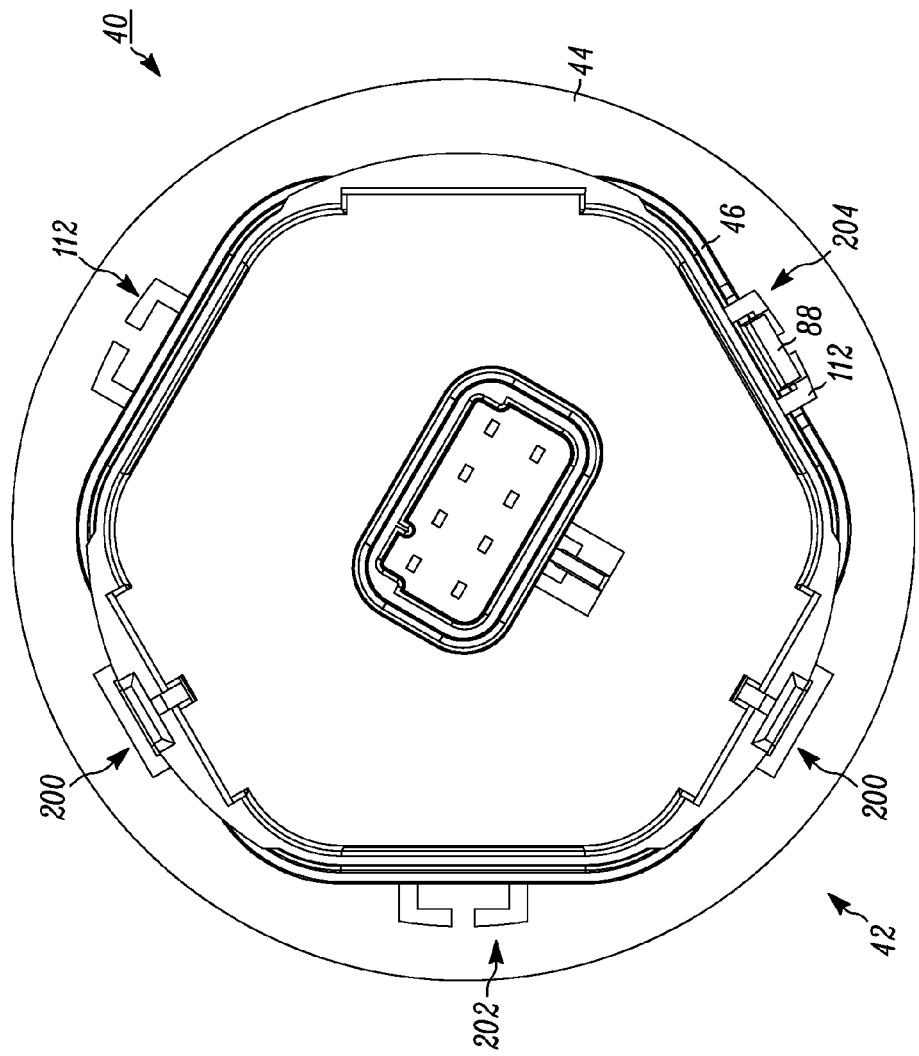
FIG. 21 is a rear view of the dash cluster system of FIG. 19.
Figure 22:
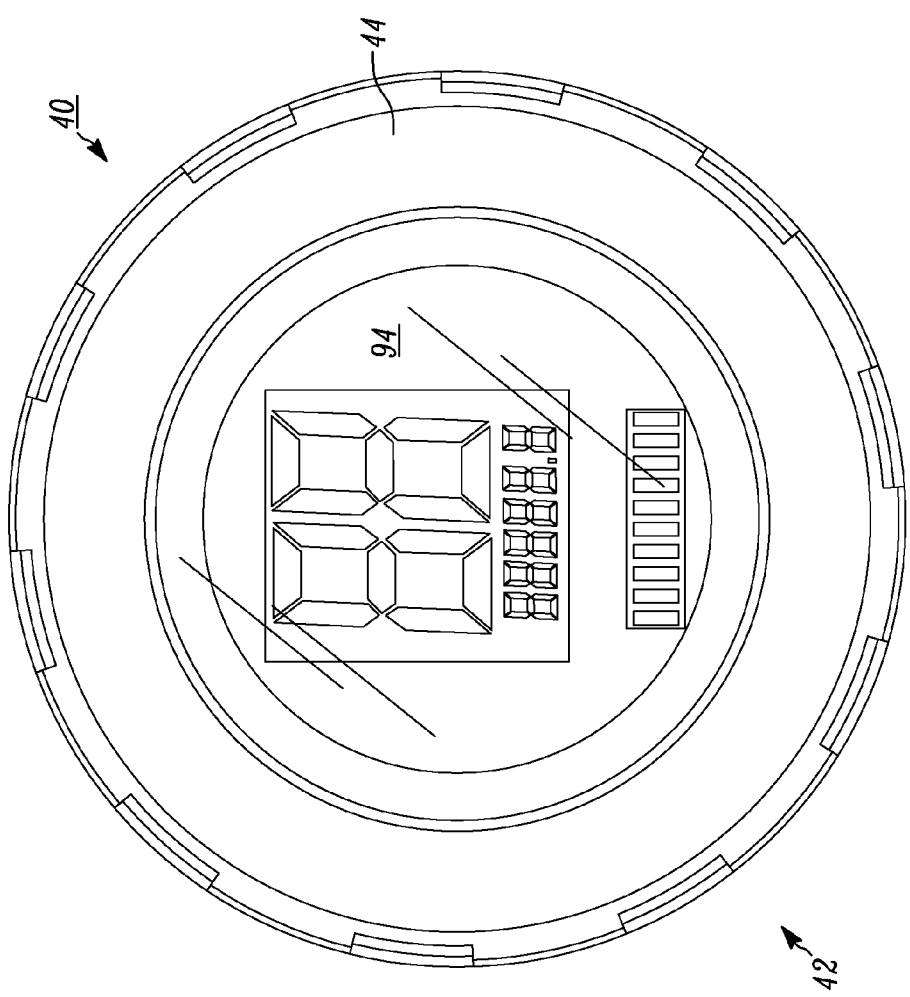
FIG. 22 is a front view of the dash cluster system of FIG. 19.
Figure 23:
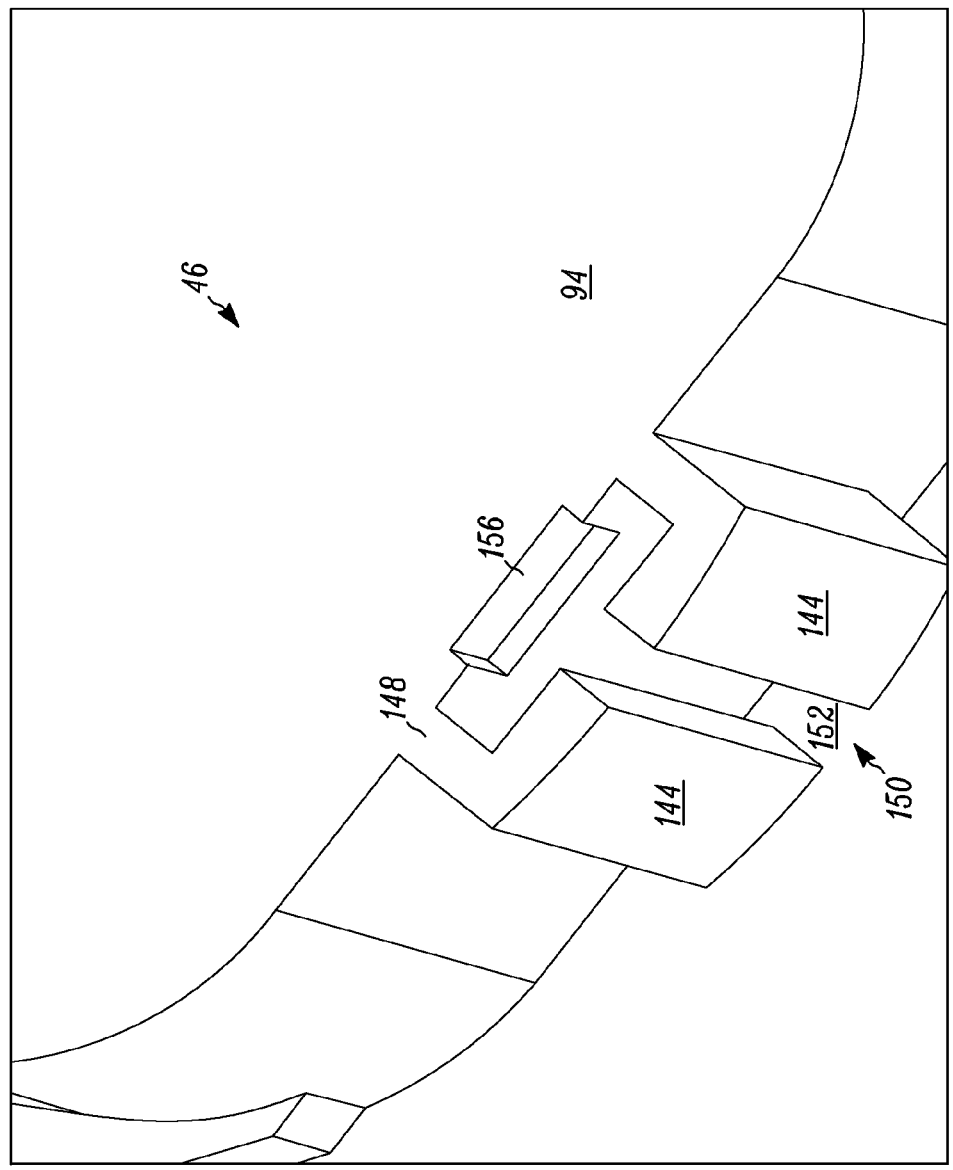
FIG. 23 is a partial perspective view of a housing constructed in accordance with one example embodiment of the present disclosure.
Figure 26:
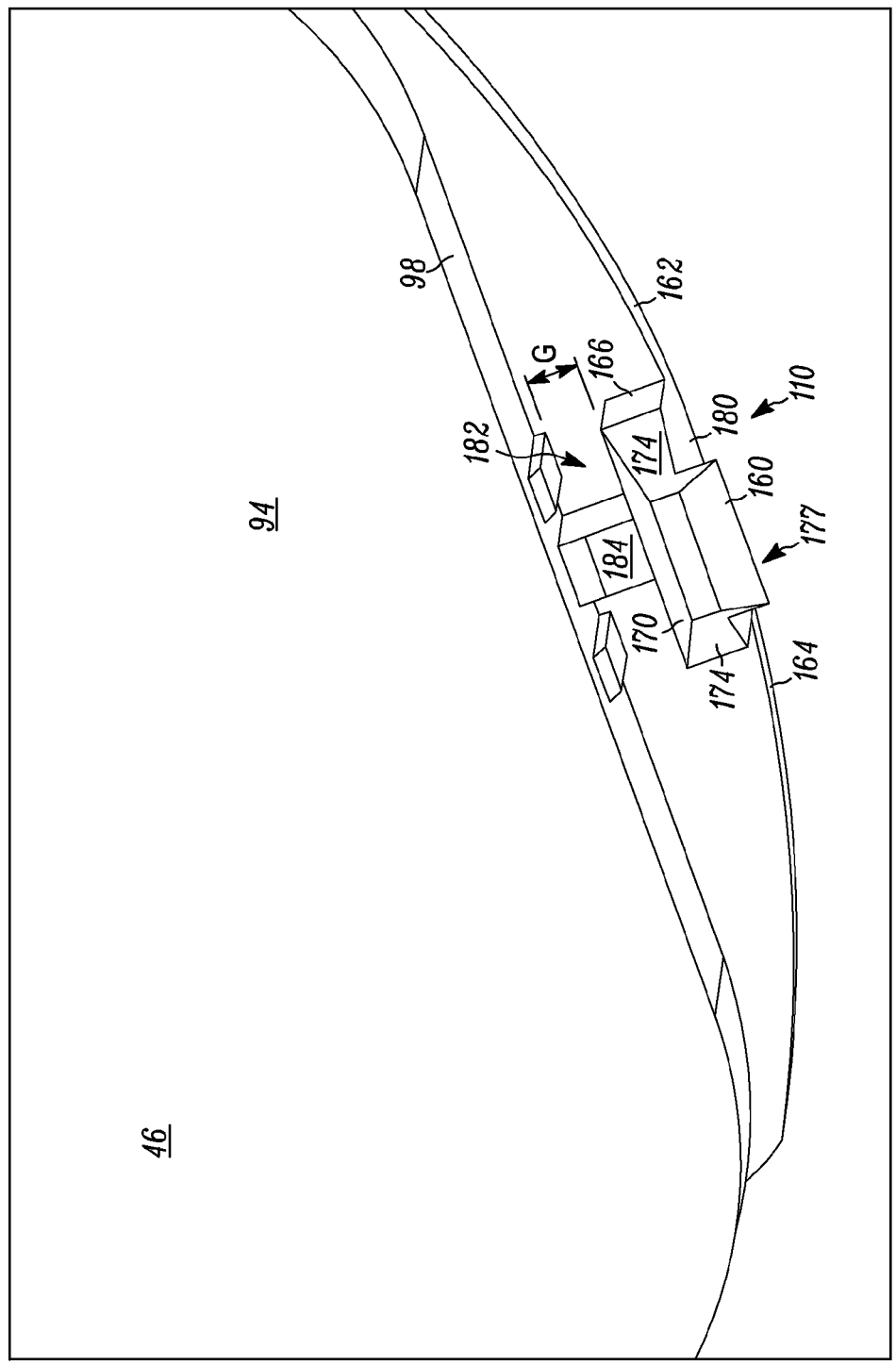
FIG. 26 illustrates a magnified perspective view of a housing male connector constructed in accordance with one example embodiment of the present disclosure.

Referring again to the example embodiment of FIGS. 19-21 is the interconnection and securing of a dash cluster system 40, and more specifically, between a bezel 44 and a housing 46. In particular, two first securing connections 200 are shown. A male connector 110 of the housing 46 engages a female connector 90 of a bezel 44 until the latch 176 of the male connector 110 reaches relief aperture 142 in the female connector 90, forming the first securing connection 200. A second securing connection 204 is formed between a male connector 88 of the bezel 44 and female connector 112 of the housing 46. Capacity for forming a third securing or interconnecting connection 202 between housings 46 is available with the remaining female connector 112 shown in FIGS. 19 and 21. Actual securing or interconnection between housings 46 is further described above and below and illustrated in FIGS. 7-8, 24-25, and 27-28.

The male connector 110 of the housing 46 in reaching the first securing connection 200 of the bezel 44 travels into the opening 136 of the female connector 90 and proceeds to the distal end 132. During the travel, the male connector 110 remains straight through the assistance of the guide rail 184 that has a sliding connection with slot 138. The first securing connection 200 is precluded from unintentional releasing as a result of the catch surface 180 extending into and through the relief aperture 142. The sliding engagement of the male connector 110 into and through the female connector 90 is further facilitated by the tapered region 174 that is undersized when compared to the opening 136. The first securing connection 200 can be released by a manual activation resulting in a depressing of the latch 176 such that the catch 180 is removed from the relief aperture 142 while the housing 46 and bezel 44 are pulled in opposite directions.

The male connector 88 of the bezel 44 in reaching the second securing connection 204 of the housing 46 travels into the opening 150 of the female connector 112 and proceeds to the connector's proximal end 146. During the travel, the male connector 88 remains straight through the sliding connection and contact of the body 114 with the walls forming the c-shaped body 144 of the female connector 112. The formation of the second securing connection 204 and first securing connections 200 occur simultaneously.

Figure 27:
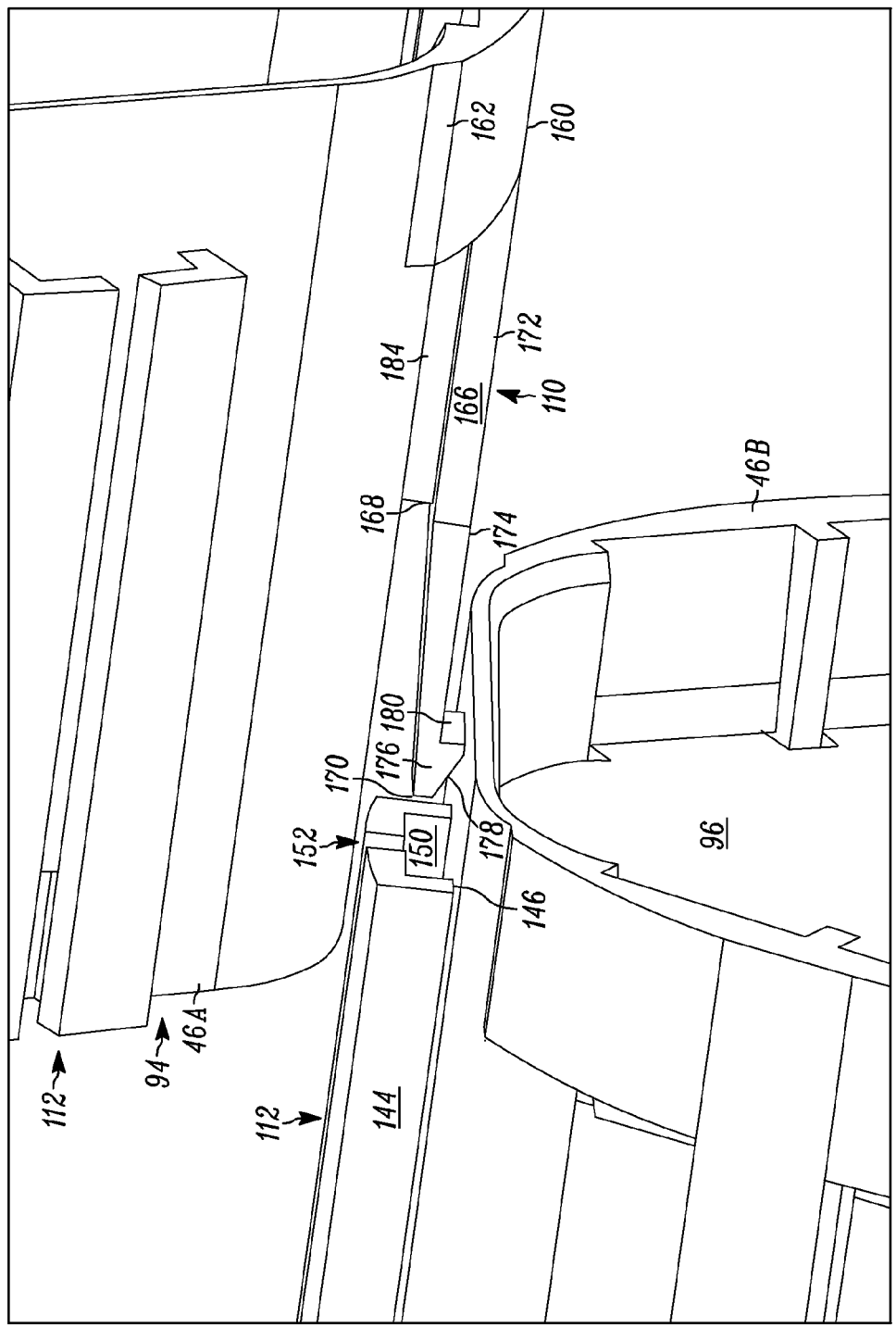
FIG. 27 is a perspective view of a male connector a first housing in proximity to and approaching a female connector of a second housing for interconnection.
Figure 28:
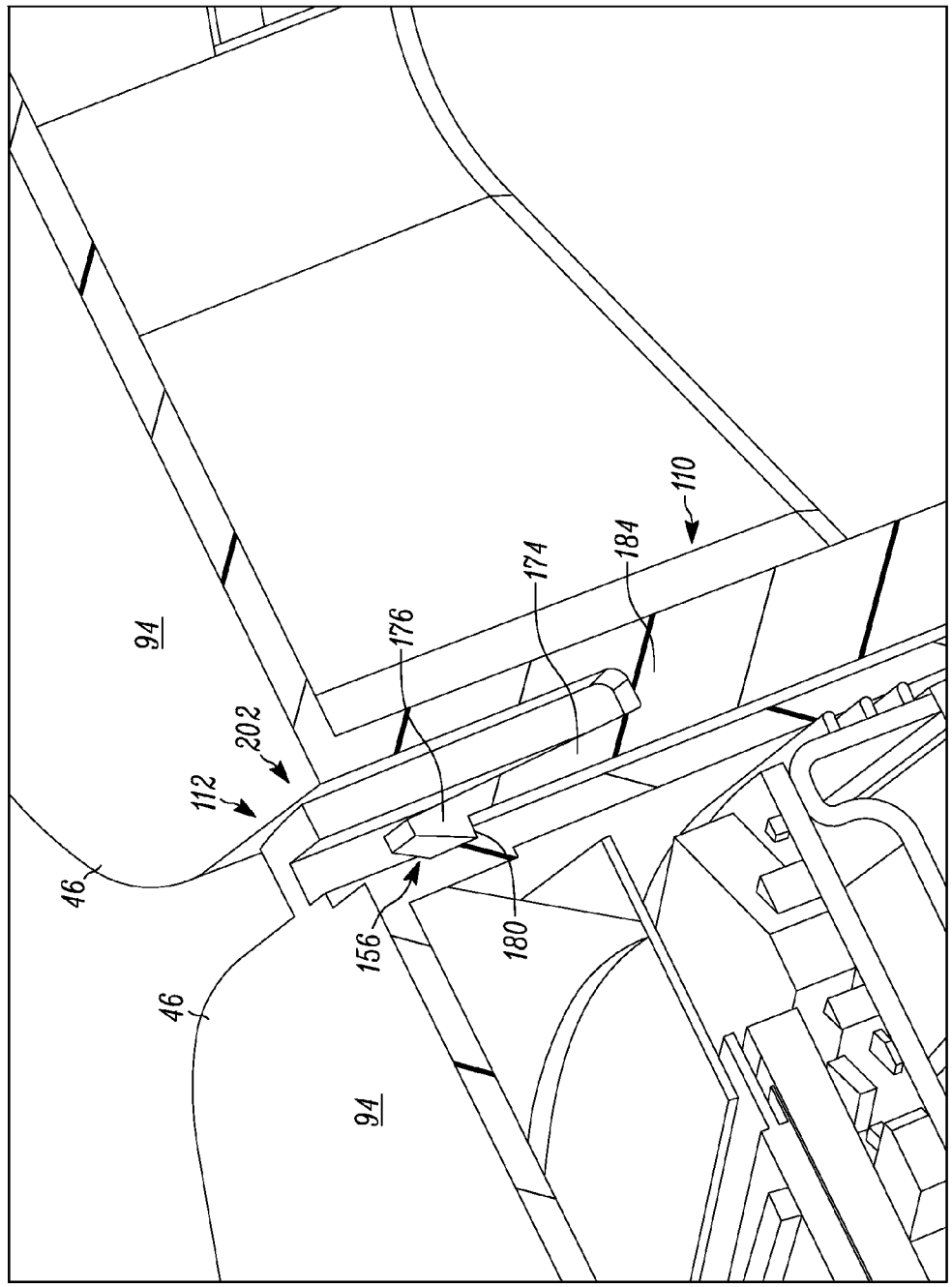
FIG. 28 illustrates a sectional perspective view of two housings forming a securing connection.

Referring now to FIGS. 27 and 28, an interconnecting engagement or third securing connection 202 is achieved between two housings 46 in accordance with another example embodiment of the present disclosure. In particular, FIG. 27 is a perspective view of a male connector 110 of a first housing 46A approaching for interconnection a female connector 112 of a second housing 46B. FIG. 28 illustrates a sectional perspective view between the two housings 46 once the third securing connection 202 is achieved. The third securing connection 202 can occur independently or simultaneously with either of the first and second securing connections 200, 204, respectively.

In the example embodiment of FIGS. 27 and 28, the male connector 110 of the first housing 46A in reaching the third securing connection 202 of the second housing 46B, travels into the opening 150 of the female connector 112 and proceeds to the distal end 148. During the travel, the male connector 110 remains straight through the assistance of the guide rail 184 that has a sliding connection with slot 152. The third securing connection 202 is precluded from unintentional releasing as a result of the catch surface 180 extending into and through the relief recess 156. The sliding engagement of the male connector 110 into and through the female connector 112 is further facilitated by the tapered region 174 that is undersized when compared to the opening 150. The third securing connection 202 can be released by a manual activation resulting in a raising of the latch 176 from the distal end and through the relief recess 156 such that the catch 180 is removed from the relief recess while the first housing 46A and second housing 46B are pulled in opposite directions.

The connecting arrangement 86 of the bezel 44 and connecting assembly 100 of the housings 46 are constructed for interconnecting the bezel with one or more housings, thereby securing the dash cluster 40 to the dash panel 12, using for example, the first and second securing connections 200 and 204, respectively discussed above. The connecting arrangement 86 of the bezel 44 and connecting assembly 100 of the housing 46 are also constructed for interconnecting one or more housings 46 and/or display modules 42 together, using for example, the third securing connection 202.

Figure 2:
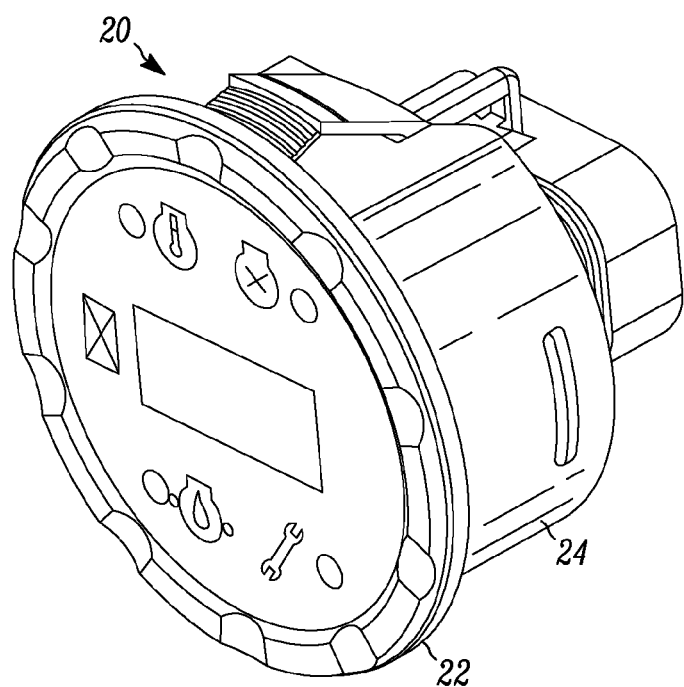
FIG. 2 is perspective view of a custom display module.
Figure 3:
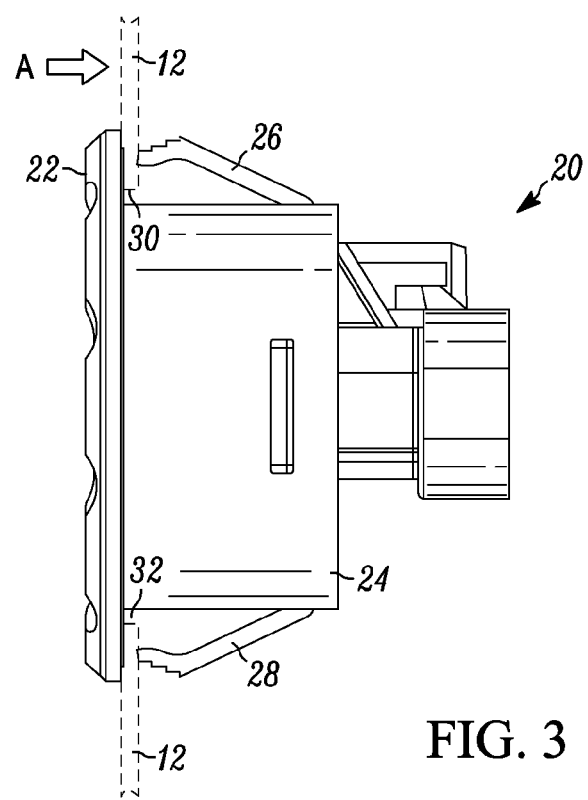
FIG. 3 is a side view of the custom display module of FIG. 2.

Such interconnecting and securing connections 200, 202, and 204 of the housings 46 or display modules 42 together through the connecting arrangement 86 and connecting assembly 100, provides flexibility in creating a dash cluster 40 with an expansion in two (2) planes, namely the vertical plane parallel to the Y-axis and horizontal plane parallel to the Z-axis as shown in FIGS. 5-8 and 25. Such interconnecting and securing connections 200, 202, and 204 between housings 46 and housings 46 and bezels 44, reduces the tooling cost in making unique molds for varying sized openings, housings, or tooling and the molding required for forming varying sized snap wings 26 and 28 coming from the housings or parts connected from the rear of the housing used in the prior art for connecting display modules to dash panels (see FIGS. 2 and 3). In addition, the interlocking snap like assembly of the dash cluster system 40 formed by using the securing connection 200, 202, and 204 advantageously avoids the time, assembly costs, tooling costs and expenses associated with the tooling and time of sonically welding a faceplate to the housing as discussed in U.S. Pat. No. 7,777,639.

The interlocking snap like assembly of the dash cluster system 40 formed by the securing connections 200, 202, and 204 advantageously provide a scalable product, allowing expansion in two different directions or planes. Stated another way, the securing connections allow multiple housings and bezels to be joined to form a dash cluster system 40 of varying size to a customer specification without additional tooling costs. In addition, a single bezel 44 supporting a large single or multiple faceplates across several housings 46 is now possible through the securing connections 200 or 202 or 204, reducing assembly time and cost compared to individual custom display modules.

In yet another example embodiment, the securing connections 200, 202, and 204 provide electronic interconnect capability from housing 46 to housing 46 or between display modules 42. Such electronic interconnect capability and the merging of electronics between housings 46 or display modules 42 through the securing connection 200, 202, and 204, would advantageously eliminate tooling, and harness costs needed for each custom display module as currently required in industry.

Illustrated in FIG. 29 is flowchart depicting a method 300 for securing a display module to a dash panel to form a dash cluster system in accordance with one example embodiment of the present disclosure. At 310, the method 300 comprises the step of providing a bezel with a connecting arrangement. At 320, the method 300 comprises the step of providing a housing with a connecting assembly. At 330, the method 300 comprises the step of interlocking the connecting arrangement with the connecting assembly to form a securing connection.

Illustrated in FIG. 30 is a flowchart depicting a method 400 for securing a display module to a dash panel to form a dash cluster system in accordance with another example embodiment of the present disclosure. At 410, the method 400 comprises the step of providing a first housing with a first connecting assembly. At 420, the method 400 comprises the step of providing a second housing with a second connecting assembly. At 430, the method 400 comprises the step of interlocking the first connecting assembly with the second connecting assembly to form a securing connection.

FIGS. 31-36 depict a dash cluster system 500 constructed in accordance with another example embodiment of the present disclosure. Like numbered features shown therein refer to like elements, having like properties, construction, and characteristics of those embodiments described above unless otherwise noted or depicted in the illustrations. One particular difference in the dash cluster system 500 from prior embodiments, the diameter of the housings are less than three (3") inches, and specifically are approximately two (2") inches in diameter. The smaller diameter housings 46, bezel(s) 44, and the corresponding dash cluster system 500, result in the new securing connection 208 and 210, as discussed below that make the assemblies more flexible for manufacturing and provides a more compact design.

Figure 31:
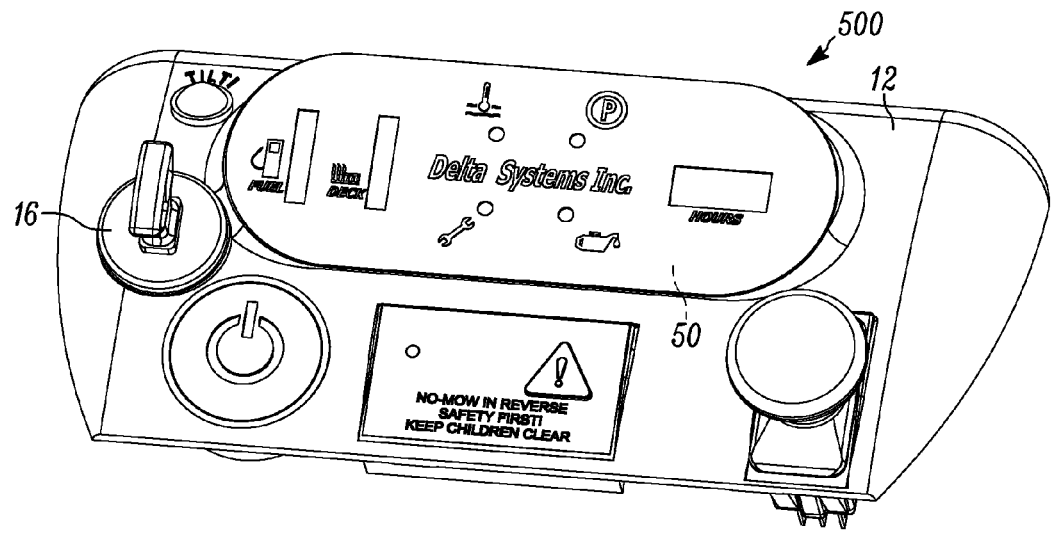
FIG. 31 is a perspective front view of a dash panel supporting a dash cluster system of multiple display assemblies in accordance with another example embodiment of the present disclosure.
Figure 32:
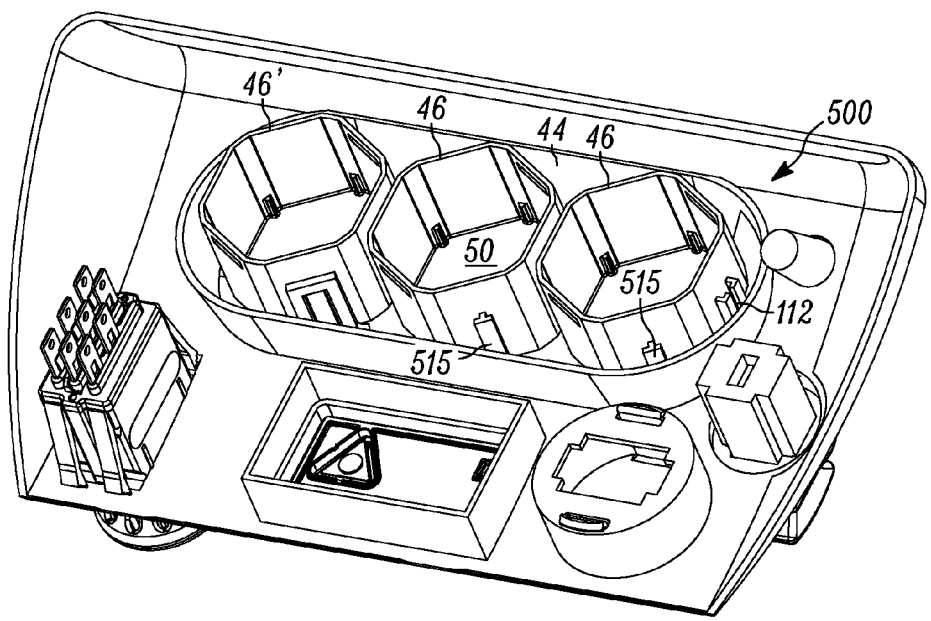
FIG. 32 is a perspective rear view of the dash panel of FIG. 31.

In one example embodiment, the dash cluster system 500 includes a single bezel 44 that is in contact with three different housings 46 as shown in FIGS. 31 and 32. The single bezel is physically connected to all three housings 46', 46 through a connection such as the connection 208 (see FIG. 35). The three housings 46', 46 are also interconnected.

Figure 33:
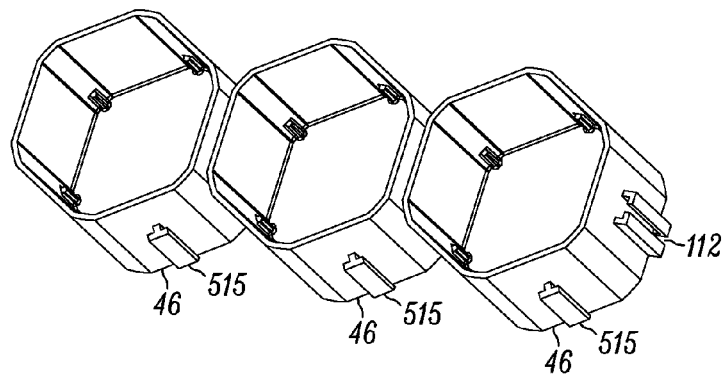
FIGS. 33 and 34 are rear perspective views illustrating housings separated from a single bezel in accordance with another example embodiment of the present disclosure.
Figure 34:
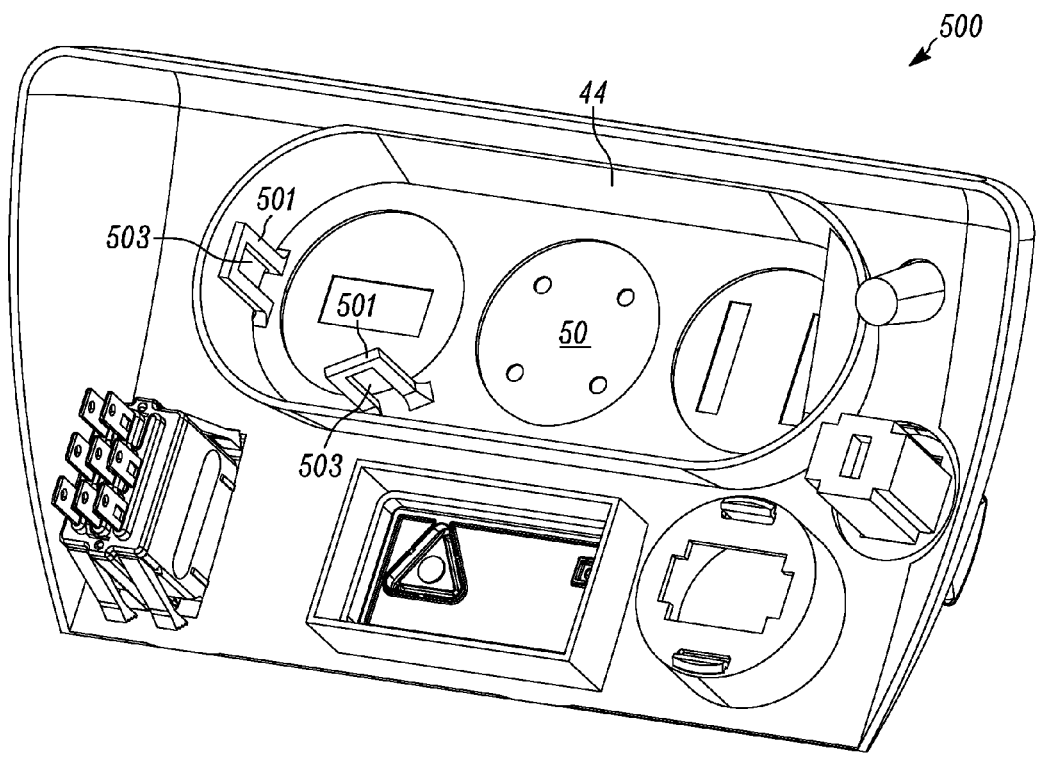

The bezel 44 of FIGS. 31-36 includes a display or decal 50 that is located under a transparent protective cover. The bezel 44 is secured to the dash 12 by gluing, snap wings, fasteners, or other attachment methods. FIGS. 33 and 34 are rear perspective exploded view illustrating housings 46 separated from the single bezel 44. Connected as a single continuous piece by its integration into the bezel 44 are securing catches 501. The securing catches 501 project from the inner or rear side of the bezel 44. The securing catches lock at least one housing 46', and in the illustrated example embodiment multiple other housings 46 to the bezel 44. This advantageously eliminates the need for multiple connection holes in the dash and allows for expansion of the display assemblies 42 from housing to housing without the need for additional connections between the housings and bezel.

Figure 44:
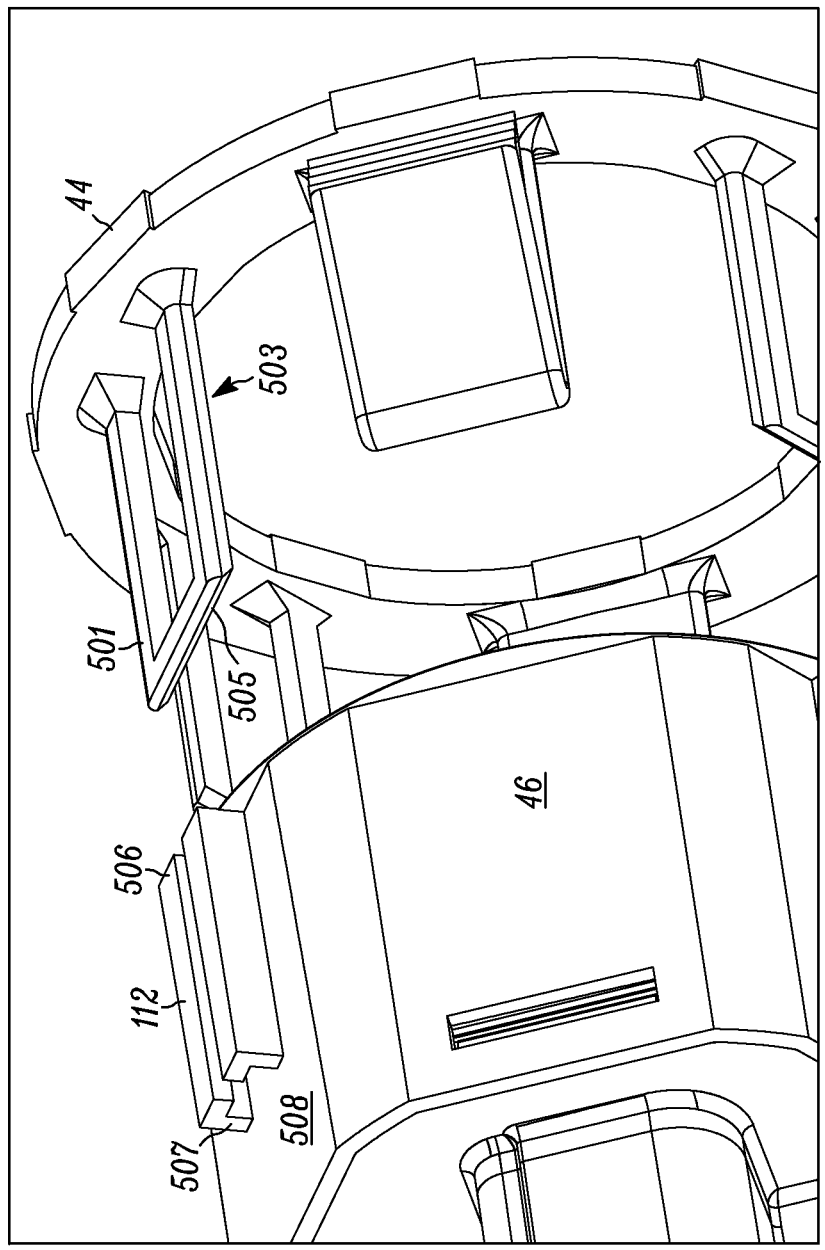
FIG. 44 is a first perspective assembly view of a bezel in relation to a housing of the display assembly of FIGS. 39-40.
Figure 45:
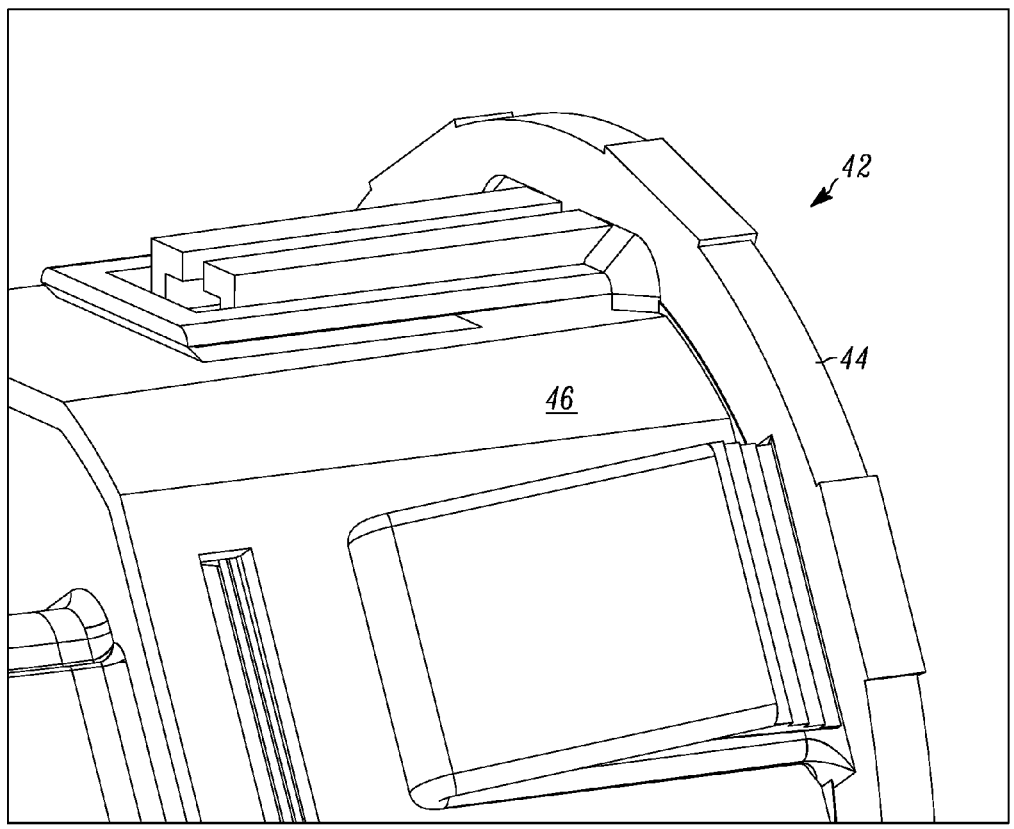
FIG. 45 is a second perspective assembly view of a bezel attached to a housing of the display assembly of FIGS. 39-40.

The bezel 44 in the illustrated example embodiment has two snap assemblies 501, however, other numbers could be used without departing from the spirit and scope of the present disclosure. Each snap assembly 501 comprises an enclosed u-shaped channel 503 that is deflected over a female connector 112 of the housing 46 as further illustrated in FIGS. 32, 35, 38, and 44-45. To facilitate the deflecting of the snap assembly 501 over the female connector 112, the snap assembly is formed from a flexible material of the bezel 44 and includes a ramp 505 (see FIG. 44). The ramp 505 contacts a front edge 506 of the female connector 112 and deflects the snap assembly 501 up and over the female connector. Deflection occurs until the u-shaped channel 503 reaches a back edge 507 of the connector 112, at which time it snaps down into location against the surface 508 of the housing 46.

The u-shaped extruded shape of the snap assembly 501 clips all the way around the female connector 112. This type of connection between the bezel 44 and housing 46 is possible with a single cluster assembly as illustrated in FIGS. 37-45 or the multiple cluster assembly in FIGS. 31-35. In a multiple cluster assembly, such connection is further possible whether it is between a single bezel and one housing that is connected to several supporting housings or between each housing in contact with one or more bezels.

Referring again to FIGS. 31-36 the dash cluster system 500 is constructed to include a second securing connection 210 in accordance with another example embodiment of the present disclosure. Like numbered features shown therein refer to like elements, having like properties, construction, and characteristics of those embodiments described above unless otherwise noted or depicted in the illustrations. The second securing connection 210 (see FIG. 35) provides an attachment between adjacent housings 46. The second securing connection 210 comprises the housing's female connector 112, and a corresponding male rail 515 that is shaped to be received on the inside the of female connector located on a separate housing. That is, housings 46 are interconnected by aligning a rail 515 (FIG. 33) with a corresponding female connector 112, and sliding the rail 515 into the recess until the front faces are coplanar. In one example embodiment, the connection between the female connector 112 and rail 515 includes a press-fit type connection.

Figure 37:
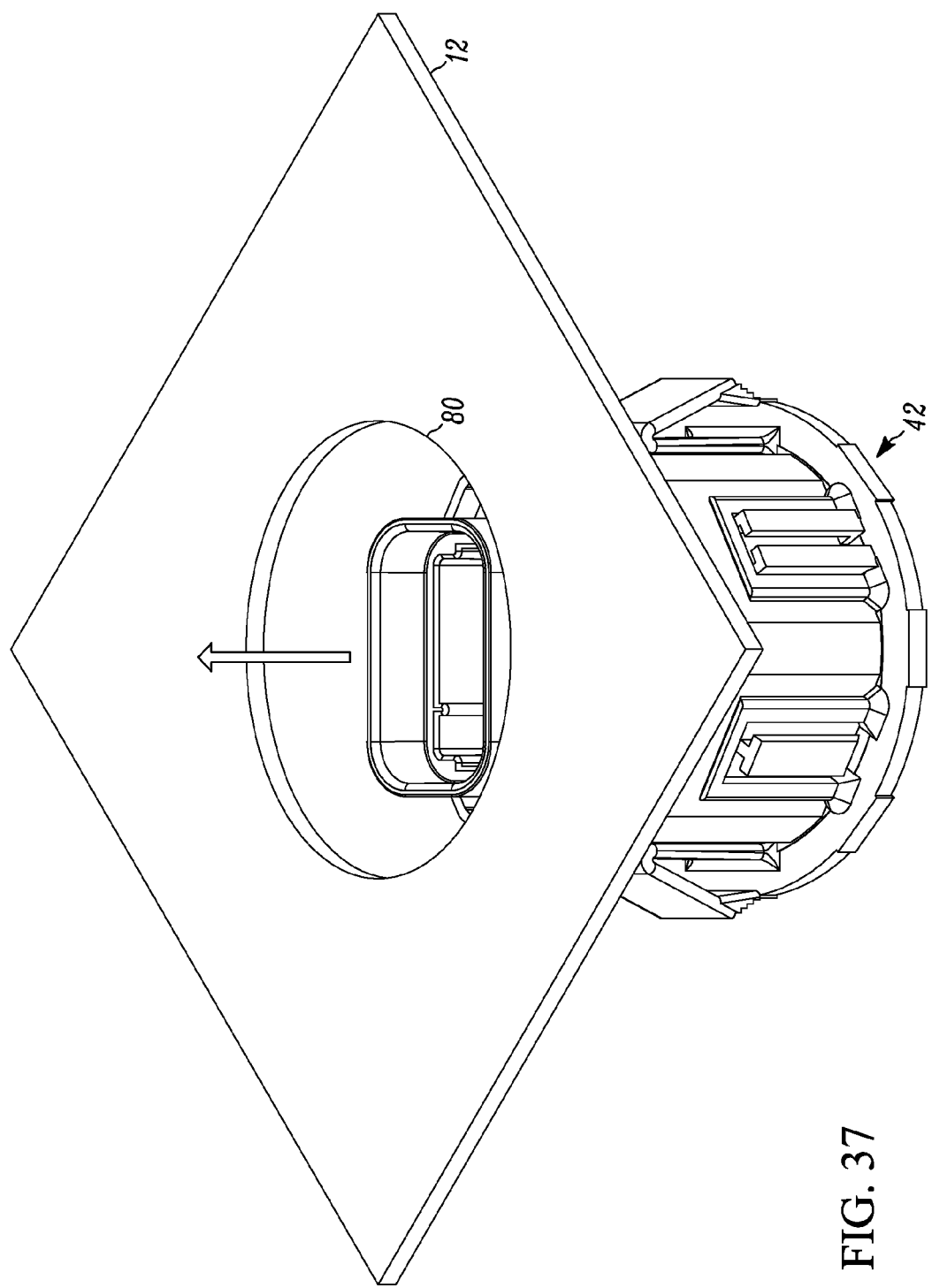
FIG. 37 is a first assembly view of a display assembly constructed in accordance with another example embodiment of the present disclosure to a dash board.
Figure 38:
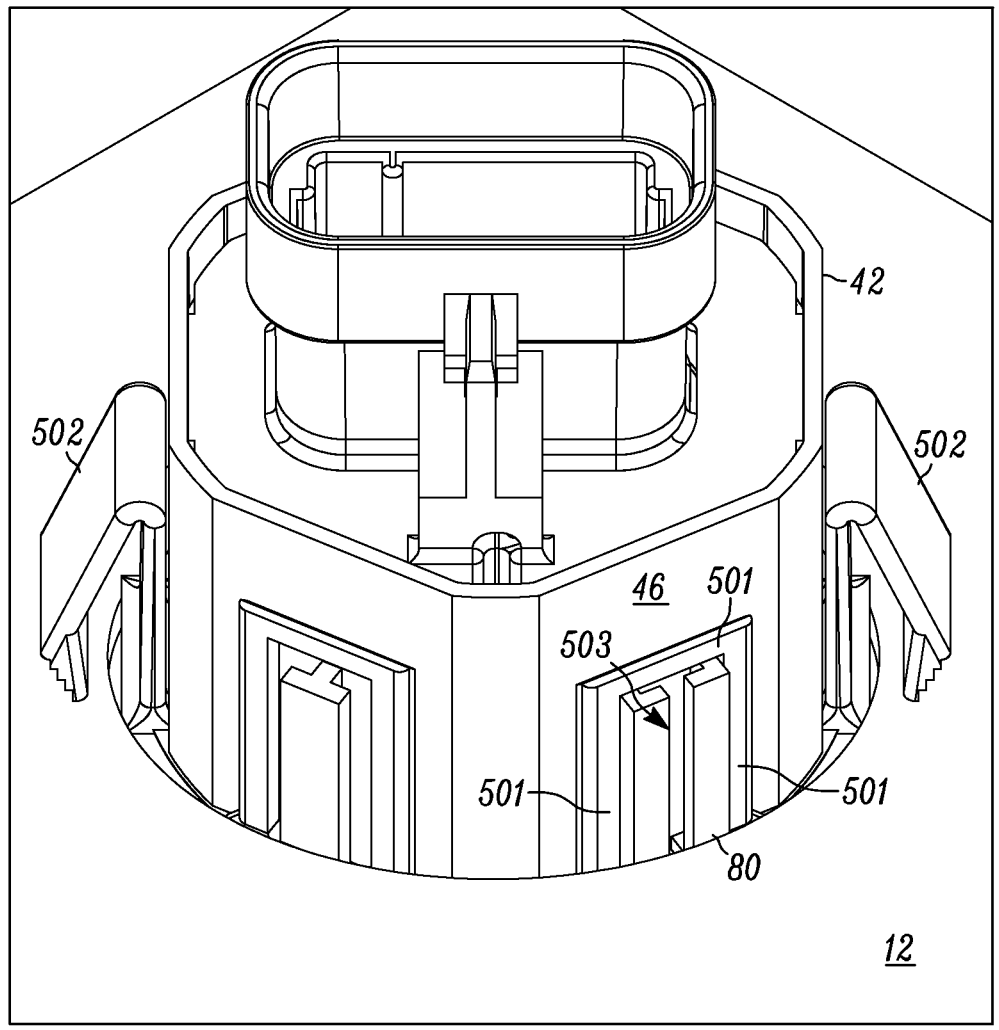
FIG. 38 is a second assembly view of the display assembly of FIG. 37 being secured to a dash board.
Figures 39, 40:
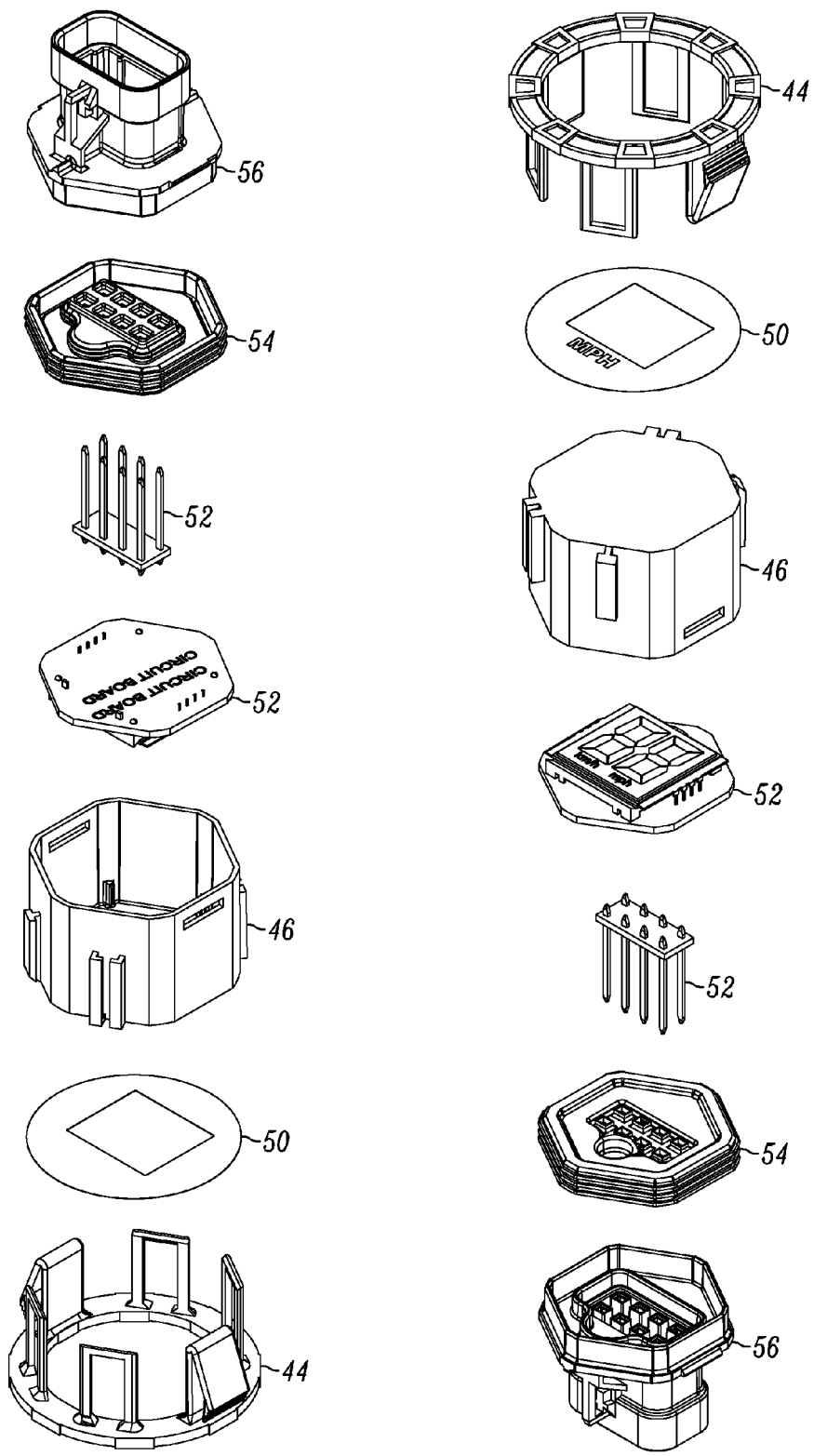
FIGS. 39-40 are exploded views of the display assembly constructed in accordance with another example embodiment of the present disclosure.
Figure 41:
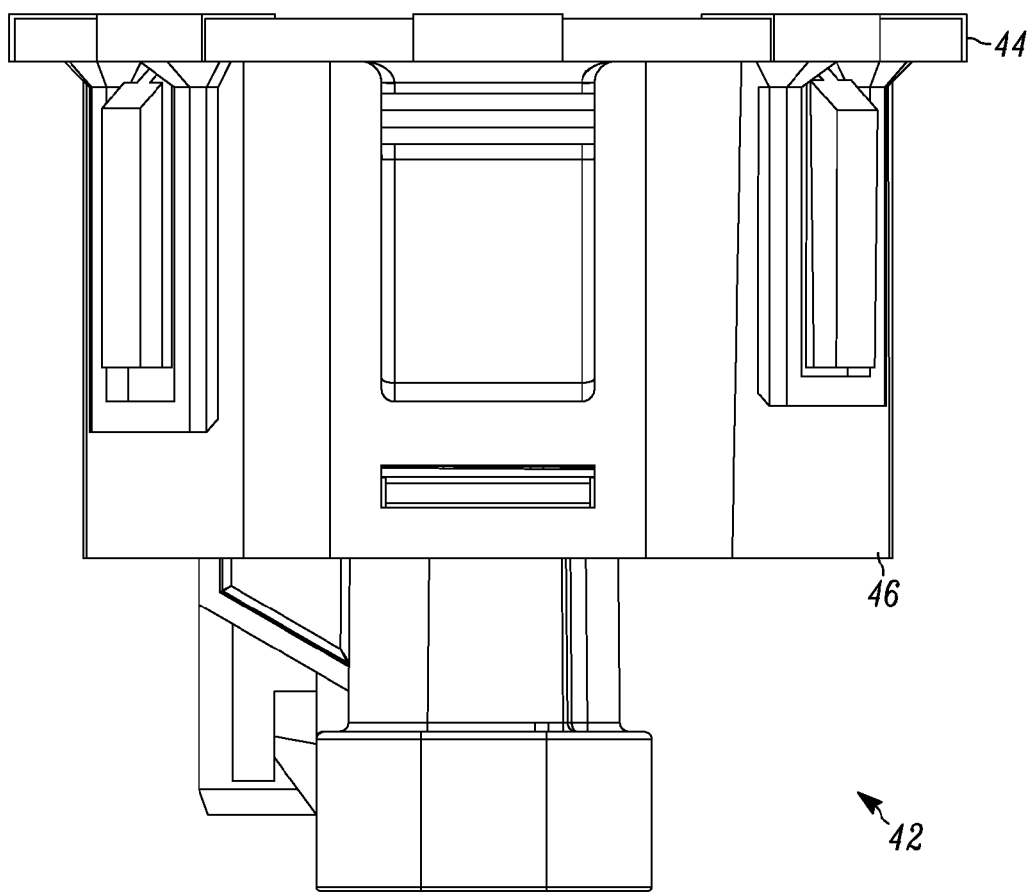
FIG. 41 is a side elevation view of the display assembly of FIGS. 39-40.
Figure 42:
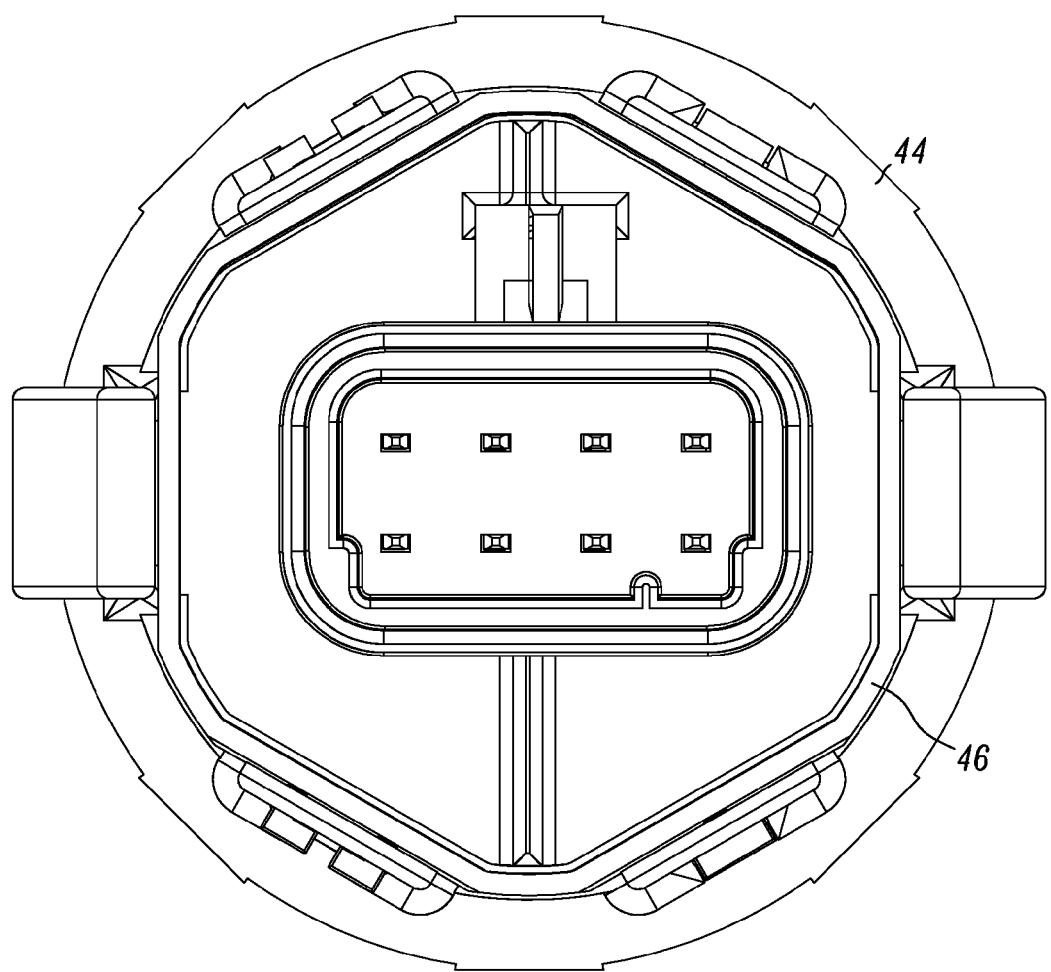
FIG. 42 is a rear view of the display assembly of FIGS. 39-40.
Figure 43:
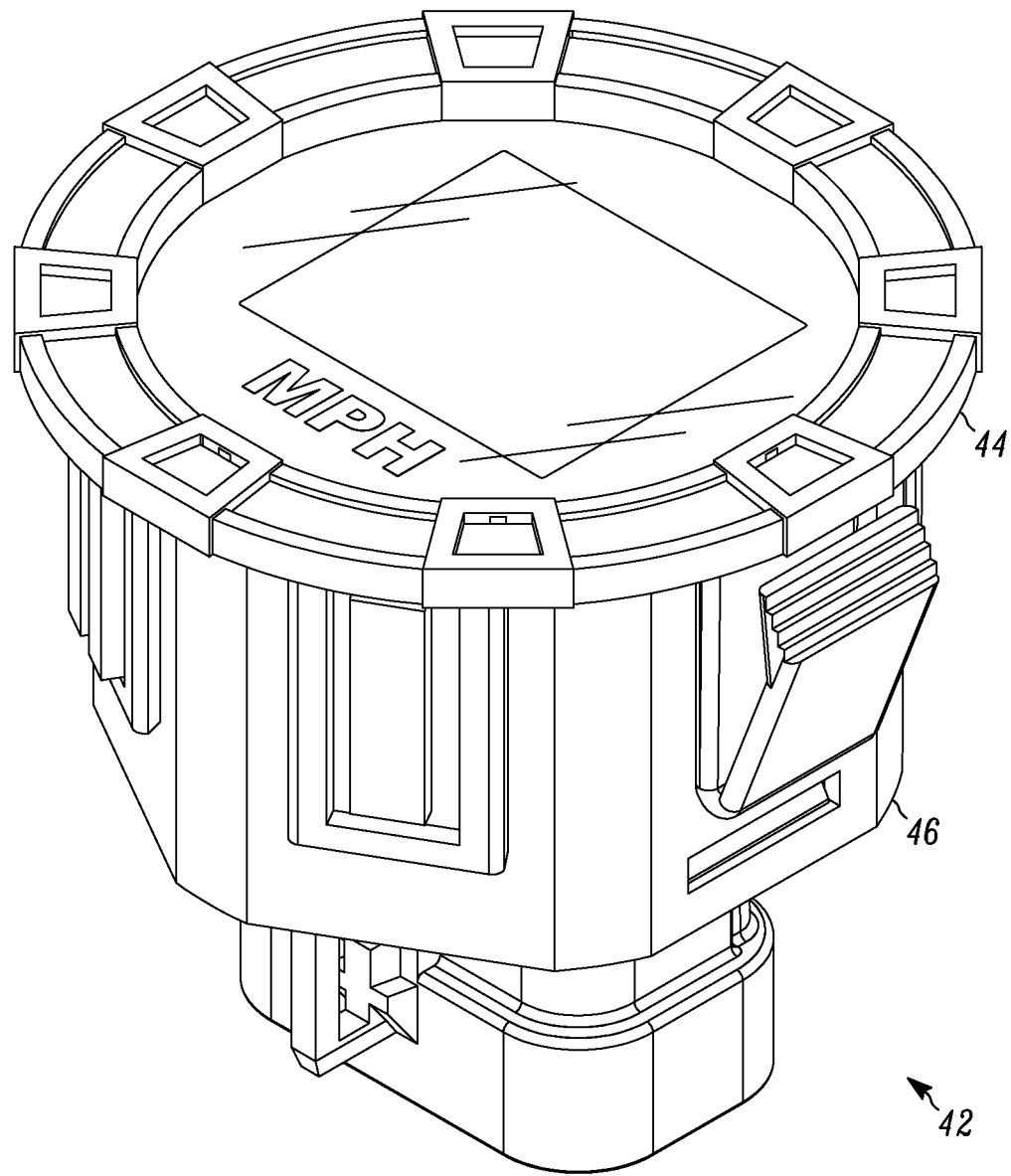
FIG. 43 is a perspective view of the display assembly of FIGS. 39-40.

Referring now to FIGS. 37-45, a single display assembly 42 is shown having snap wings 502 formed as part of, and located along the periphery of the housing 46. The snap wings 502 as shown in FIGS. 37 and 38 pass through an opening 80 in the dash panel 12, locking the display assembly 42 to the dash panel. One or more housings 46 and display assemblies 42 can be attached as described in the embodiments above to the housing shown in FIGS. 37-38 after passing and securing the first display assembly to the dash. Such connected housings 46 can be attached along any side of the housing shown, resulting in a linear pattern (as illustrated in the example embodiments of FIGS. 33 and 35), a zig-zag pattern, or any combination at 60 degrees for the housing's hexagonal shape. While the housing 46 is shown as being hexagonal, it should be appreciated that any geometrical shape with any combination of securing connections for each side can be used without departing from the spirit and scope of the present disclosure.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

What is claimed is:

1. A dash cluster for mounting to a support panel in a region of a panel opening that extends through the support panel comprising:
    a housing for mounting components of said dash cluster behind said support panel and having a first housing surface conforming generally to an inner surface of the panel in the region of the opening for contacting the panel, said housing comprising a connecting assembly having at least one housing connector in spaced relation to the first housing surface for securing the housing in an operative position with the first housing surface abutting the panel; and
    a bezel having a rear side that engages the panel opening in use, said bezel further comprising a connecting arrangement formed from at least one bezel connector extending away from said rear side of the bezel for connecting the bezel to said housing; wherein
    a securing connection is formed between said housing and said bezel by an interlocking of said housing connector with the bezel connector which extends through said opening to fix the rear side of the bezel in engagement with said panel.

2. The dash cluster of claim 1 wherein said connecting assembly further comprises a second housing connector positioned along outer surface of the housing for engaging a complementary connector on a second housing to form a housing to housing connection between two housings.

3. The dash cluster of claim 2 wherein both of the two housings comprise a bounding wall that extends peripherally around a housing interior having an outer surface and further wherein a first of said two housings includes a male connector extending from the outer surface and a second of the two housings has a female connector for engaging the male connector to attach the two housings.

4. The dash cluster of claim 3 wherein both of the two housings comprise generally hexagonal bounding walls and wherein one of the six sides of one bounding wall includes a male connector for connecting engagement with a corresponding female connector supported by one of the six sides of the other housing.

5. The dash cluster of claim 1 wherein the housing comprises a bounding wall that extends peripherally around a housing interior having an outer surface from which the housing connector extends.

6. A dash cluster system for use with power equipment, the dash cluster system comprising;
    a bezel for protecting components of a display assembly, the bezel comprises a front side and a rear side, said bezel further comprises a connecting arrangement continuously formed with said bezel having at least one extending connector projecting from said rear side;
    an annular housing having inner and outer regions formed by a continuous wall, the inner region secured to said rear side of said bezel and supporting said components of a display assembly therein;
    at least one peripheral connector continuously formed with and extending from said outer region of said annular housing; and
    a securing connection formed between said housing and said bezel by the engagement between said peripheral connector of said annular housing and said extending connector of said connecting arrangement of said bezel.

7. The dash cluster system of claim 6 wherein said bezel extending connector comprises a female connector having an opening and a slot for guiding said peripheral connector, the peripheral connector comprising a male connector having distal and proximal ends, the distal end comprising a catch for interlocking said male connector with said female connector to join the bezel with said housing.

8. The dash cluster system of claim 6 wherein said bezel extending connector comprises a male connector having a latch and said peripheral connector comprises a female connector having distal and proximal ends, the proximal end further comprising a latch for interlocking said male connector with said female connector to join the bezel with said housing.

9. For use with a dash cluster for mounting components to a support panel in a region of a panel opening that extends through the support panel, a component housing comprising:
- a housing body having a panel facing housing surface conforming generally to an inner surface of the panel in the region of the opening for contacting the panel and a peripheral wall that extends around a housing enclosure having an outer peripherally extending wall surface, a connecting assembly comprising first and second housing connectors in spaced relation to the panel facing housing surface spaced apart circumferentially about the peripheral wall for securing the housing in an operative position in relation to the panel; wherein
- a securing connection is formed between the housing and one or more of a bezel and a second housing by an interlocking of said first and second housing connectors with a bezel connector and a housing connector of said second housing.

10. A dash cluster arrangement for use with power equipment, the dash cluster arrangement comprising;
- a bezel for protecting components of a display assembly, the bezel comprises a front side and a rear side, said bezel further comprises a connecting assembly continuously formed with said bezel having at least one extending connector projecting from said rear side, the extending connector having a u-shaped opening;
- a housing having inner and outer regions formed by a continuous wall, the inner region enclosed by said rear side of said bezel for supporting and protecting components therein;
- at least one peripheral connector continuously formed with and extending from said outer region of said housing; and
- a securing connection formed between said housing and said bezel during assembly by the engagement between said peripheral connector of said housing and said extending connector of said connecting assembly of said bezel.

11. The dash cluster arrangement of claim 10 wherein said peripheral connector includes a corresponding u-shaped projection extending from said outer region of said housing, the u-shaped projection being surrounded by said u-shaped opening in said connector when said bezel is secured to said housing.

12. The dash cluster arrangement of claim 11 wherein said u-shaped connector further comprises a ramp on a leading side of said connector for deflecting the connecting assembly as the u-shaped connector passes over a leading side of said u-shaped projection, during the attachment of the bezel to said housing.

* * * * *